United States Patent [19]

Johnshoy

[11] E Patent Number: Re. 33,278

[45] Reissued Date of Patent: Jul. 31, 1990

[54] CONTINUOUSLY VARIABLE TRANSMISSION AND TORQUE RETAINING DIFFERENTIAL

[76] Inventor: Edward W. Johnshoy, R.R. #1, Box 258A, Mentor, Minn. 56736

[21] Appl. No.: 295,289

[22] Filed: Dec. 30, 1988

Related U.S. Patent Documents

Reissue of:

[64] Patent No.: 4,784,017
Issued: Nov. 15, 1988
Appl. No.: 27,215
Filed: Mar. 17, 1987

U.S. Applications:

[63] Continuation-in-part of Ser. No. 881,827, Jul. 3, 1986.

[51] Int. Cl.[5] ..... F16H 37/06; F16H 1/40

[52] U.S. Cl. ..... 475/6; 74/665 T; 475/5; 475/7; 475/9

[58] Field of Search ..... 74/665 A, 665 B, 665 C, 74/665 T, 715, 710, 713, 674, 675, 793

[56] References Cited

U.S. PATENT DOCUMENTS

| | | | |
|---|---|---|---|
| 633,234 | 9/1899 | Catois | 74/665 T |
| 1,724,714 | 8/1929 | Kersten | 74/675 |
| 2,128,413 | 8/1938 | Hejduk et al. | 74/665 A |
| 2,422,343 | 6/1947 | Duer | 74/675 |
| 2,780,299 | 9/1956 | Egy | 74/675 |
| 2,840,841 | 5/1958 | Matson | 74/713 X |
| 2,847,876 | 8/1958 | Willard | 74/681 X |
| 2,898,779 | 5/1958 | Mickelson | 74/715 |
| 3,013,452 | 12/1961 | Hornbostel | 75/675 |
| 3,220,284 | 11/1965 | Horvath | 74/674 |
| 3,364,789 | 1/1965 | Whitfield | 74/675 |
| 3,477,300 | 11/1969 | Segerstad | 74/675 |
| 3,788,165 | 1/1974 | Klotsvog | 74/665 C X |
| 4,599,916 | 7/1986 | Hirosawa | 74/689 |
| 4,602,525 | 7/1986 | Moroto et al. | 74/689 |
| 4,608,885 | 9/1986 | Koivunen | 74/689 |
| 4,624,153 | 11/1986 | Itoh et al. | 74/689 |
| 4,627,308 | 12/1986 | Moroto et al. | 74/689 |
| 4,628,766 | 12/1986 | de Brie Perry | 74/691 |
| 4,630,504 | 12/1986 | Smirl | 74/689 |
| 4,633,736 | 1/1987 | Sakakibara et al. | 74/689 |
| 4,644,820 | 2/1987 | Macey et al. | 74/689 |
| 4,700,589 | 10/1987 | Coronel | 74/681 X |

FOREIGN PATENT DOCUMENTS

| | | | |
|---|---|---|---|
| 567890 | 10/1957 | Italy | 74/675 |

OTHER PUBLICATIONS

Lamm, Michael; "Get Ready for a New Kind of Automatic Transmission," *Popular Mechanics*, Jun. 1984, pp. 70–71, 105–108.

*Primary Examiner*—Dirk Wright
*Attorney, Agent, or Firm*—Kinney & Lange

[57] ABSTRACT

A fully geared continuously variable transmission controls output ratios of differentiating gear sets by using a control gear set that is controlled as to rotation speed by a variable speed drive. The ratio gear sets can be bevel gear differentiating clusters or planetary gear sets. As disclosed, the transmission may have two sets of ratio control gears driving separate output shafts that are coupled to rotatable worms engaged with a worm gear to control differentiation between the output shafts which are used as drives for two wheel or four wheel drive vehicles at selected engine idle rpm the variable speed drive rotates the control gears at a selected speed and directs rpm, that holds the output shafts at 0 rpm. As engine rpm is increased to selected cruising final drive ratio the variable speed drive rpm is decreased proportionately to zero to change the output drive ratio continuously as a function of a selected parameter.

13 Claims, 13 Drawing Sheets

CONTINUOUSLY VARIABLE TRANSMISSION AND TORQUE RETAINING DIFFERENTIAL

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of my copending application Ser. No. 881,827, still pending, filed July 3, 1986 for TORQUE RETAINING AND PROPORTIONING DIFFERENTIAL DRIVE ASSEMBLY.

BACKGROUND OF THE INVENTION

1. Field of the Invention.

The present invention relates to continuously variable drive trains especially useful with torque proportioning differential drives.

2. Description of the Prior Art.

Various work has been carried out on continuously variable transmissions that provide higher gas mileage, and better acceleration than conventional automatic transmissions, without any bumps or jerks when shifting. Many of the continuously variable transmissions (CVT) are now on sale, and in the June, 1984 issue of Popular Mechanics, in an article entitled "Get Ready For a New Kind of Automatic Transmission," by Lamm, pp. 70, 71, 105–108, a discussion of such transmissions is presented and a cutaway illustrative showing of a transmission used by Fiat is included. Further, the v-belt type transmission used by Volvo is illustrated in the article.

The desirability of torque retaining and proportioning differential drives also has been recognized, and combining continuously variable transmission with a torque retaining and proportioning differential drive assembly provides not only smooth operation, but insures that the torque that is transmitted through the continuously variable drive train will be proportioned to the appropriate wheels.

SUMMARY OF THE INVENTION

The present invention relates to a continuously variable transmission that utilized a simple controlled gear system for permitting varying the output drive ratio of differential or planetary gearing as a function of engine speed, load or even as a function of manual signals, in a relatively low-cost assembly. An external motor is used for controlling the final drive ratio, and actually controls the relationship of a final gear cluster housing that can be either a bevel gear cluster or a planetary gear cluster, so that instead of having a fixed final drive ratio, the ratio can be varied, depending upon the changes that are put in by the drive for the gear housing.

The concept of providing the continuously variable output drive train is applicable to a wide variety of output differentials but is particularly adapted for use with a torque proportioning differential drive. The continuously variable transmission can be applied to either a single intermediate differentiating gear assembly, or can be applied to a mid-differential when four-wheel drive operations are desired. The continuously variable transmission also can be used without a differential drive, as for a drive transmission for small vehicles such as motorcycles, ATV's or snowmobiles, if desired, and of course by varying the gear ratios of the drive gears, substantially any desired relationship can be arrived at for adequate torque carrying capacity and final drive ratio.

When used with the torque proportioning differential drive, as disclosed herein, the assembly is compact, provides very substantial control over the operation of the vehicle.

The gear drive eliminates the problems that are inherent in use of belt drives as in some of the other continuously variable transmissions, and yet gives the advantages of being simple, and easier to manufacture and to repair than conventional automatic transmissions which have become highly complex in recent years, especially the new models with lock-up torque converters, four speeds and overdrive gearing. The disclosed continuously variable transmission can be made very compact, so it takes up less space than today's typical automatic transaxle, and it is lighter weight because of its simplicity and compactness.

The continuously variable transmission can be stepless, so that no jerks are noticed as it moves through an infinity of gear drive ratios, and it can deliver better fuel mileage or economy than a conventional automatic transmission. It can carry a great span of gear ratios and can be operated or controlled by existing microprocessors now used on automobiles, and which also have a plurality of sensor inputs relating to sensed engine speed, load, torque and other operating factors.

The torque retaining and proportioning differential drive assembly with which the continuously variable transmission is disclosed as operable, utilizes a pair of output shafts from the gear train which are coupled through worms on each of the output shafts, which are joined or coupled through a single worm gear, which will control the differential rotation between the output shafts as a function of torque. The torque retaining and proportioning drive will prevent the torque thrust from one of the output drive shafts that has greater torque load from speeding up the power shaft on the poor traction or low torque output side during both differentiating and non-differentiating drive. Yet, it will permit differential drive needed during turning an automobile, and at the same time will provide the continuously variable gear ratio function for the output shafts.

The gear drive assemblies shown in this application can be made compact and use standard gear components, bearings and the like. The control motor can be a reversible high torque electric motor, such as that shown in the August, 1986 Popular Science at page 78, as being made by Unique Mobility of Denver, Colo. Additionally, hydraulic control motors can be used, as well.

DETAILED DESCRIPTION OF THE PREFERRED EMBODIMENTS

The torque proportioning differential drive shown in a simplified, two-wheel drive embodiment is illustrated in FIGS. 1-5.

Figure 1:
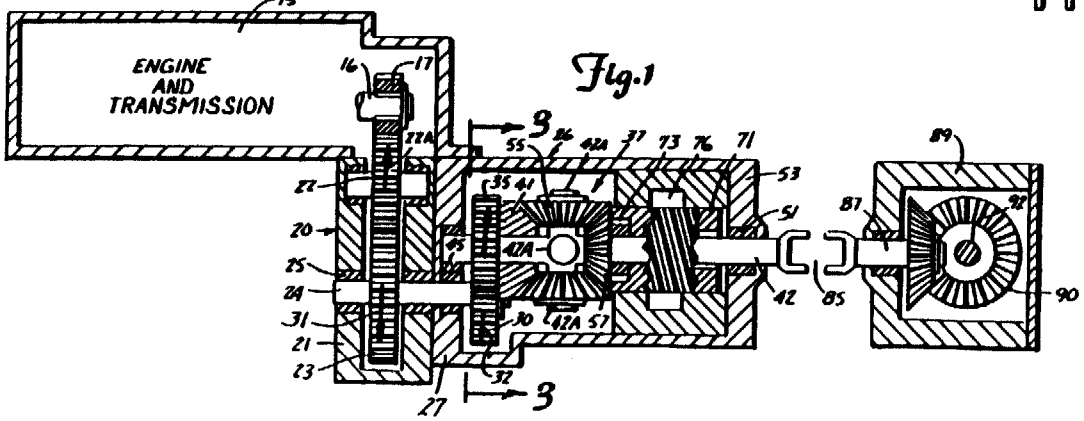
FIG. 1 is a side elevational view of a schematically shown engine and transmission, and showing a rear drive torque proportioning differential arrangement with parts in section and parts broken away.

The torque proportioning differential drive as will be shown uses parallel, independent output shafts which drive the rear or front wheels independently, so that there are parallel power paths where the power is divided for the final drive. In an embodiment used in connection with four wheel drive vehicles the torque proportioning differential is used in a mid-differential drive for driving forward and rear differentials that then drive the axles to the drive wheels. As shown in FIG. 1, an engine and transmission indicated schematically at 15 has a transmission output shaft 16 that is a normal drive output shaft from a transmission having suitable gear ratios. The engine and transmission can be conventional, either manual shift or automatic, and the output shaft 16 has a spur gear 17 drivably mounted thereon, which in turn will drive the output drive components. In the embodiment shown in FIG. 1, it is to be understood that the intermediate gear assemblies can be modified to obtain the desired gear ratios, and may not even be used if desired so that a direct drive to the differential components can be made from the transmission output shaft. Intermediate gear cases may be used, if desired, as well.

However, as shown, a spur gear drive, which can have interchangeable size gears, is shown generally at 20 and it is fixed to the transmission housing. The term spur gear is intended to include gears with angled teeth or actual helical teeth on the gears, but with parallel mounting shaft axes, as gears are now made for noise reduction. The gear drive 20 has an outer housing 21 that mounts a first idler gear 22 that meshes with gear 17 and rotates on its outer periphery as shown in FIG. 1 in direction of the arrow 22A. This gear is suitably mounted on a shaft that rotates in bearings in the housing 20 in a conventional manner.

Gear 22 in turn drives a spur gear 23 that is drivably mounted onto a drive shaft 24. The drive shaft 24 is mounted on suitable bearings 25 in the gear case 21, and also passes through the rear wall of this gear case 21 and through a forward wall 27 of a differential drive gear case indicated generally at 26. The forward wall 27 of the gear case 26 has suitable bearings for mounting the shaft 24, and as stated the gear 23 drives the shaft 24 which in turn is driven through a spline or suitable member to drive a spur gear 30 (see also FIG. 3) that is mounted inside the differential housing 26. The spur gear 30 as shown in this form of the invention is at the lower side of the differential housing 26. Gear 23 is rotated in direction that is indicated by the arrow 31 (FIG. 1), and gear 30 thus also rotates in this same direction as indicated by the arrow 32. Arrow 32 is also shown in FIG. 3.

Figure 2:
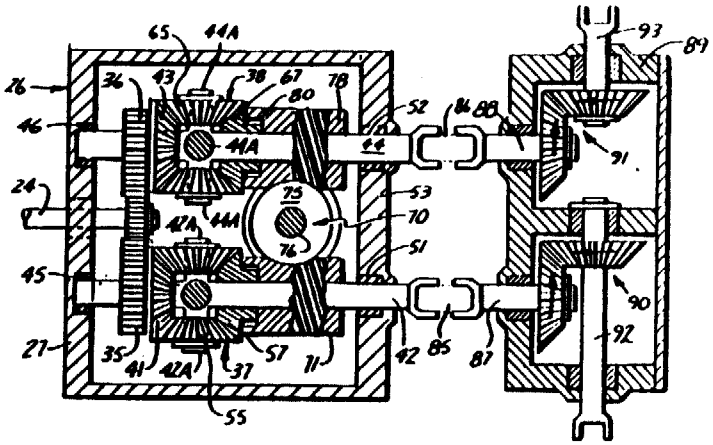
FIG. 2 is a top part sectional view of the differential and rear drive of FIG. 1.
Figure 3:
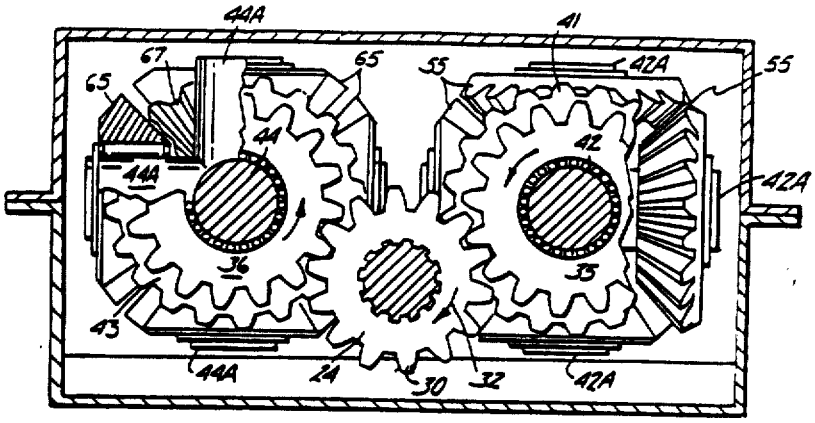
FIG. 3 is a sectional view taken along line 3—3 in FIG. 1.

The gear 30 as shown in FIG. 3 drives a pair of power dividing spur gears 35 and 36, respectively. The spur gears 35 and 36 comprise power input gears to a pair of differential bevel gear drive clusters indicated generally at 37 and 38 (FIG. 2), respectively. These drive clusters 37 and 38 are identically constructed, as are the differential drive gear clusters in other forms of the invention, but in this form of the invention the gears will be separately numbered, even though they operate in precisely the same manner for the output drive.

The first input drive spur gear 35 is splined onto, or otherwise drivably attached to a first bevel gear 41 forming a portion of the differential drive cluster 37. The bevel gear 41 and its spur gear 35 are rotatably mounted onto a first output shaft 42 which is of a pair of parallel drive shafts. The shaft 42 comprises one of the parallel power paths that is used with the torque proportioning differential drive.

The gear 36 in turn is splined or otherwise drivably attached to a bevel gear 43 (FIG. 2). The spur gear 36 and bevel gear 43 are both rotatably mounted onto a second of the parallel drive shafts indicated at 44. The output drive shafts 42 and 44 are identically constructed as well.

The rotatable mounting of the spur gear and bevel gear set 35 and 41 for the cluster 37 on shaft 42 and the spur and bevel gear set 36 and 43 for the cluster 38 on shaft 44 shows there is no drive directly from these gears to the parallel output shafts 42 and 44.

The shafts 42 and 44 have first end portions rotatably mounted on suitable bearings 45 and 46 in the front wall 27 of the differential housing or case 26. The bearings 45 and 46 preferrably are tapered roller bearings that take both end thrust and radial loads, although the bearings are shown only schematically. The shafts 42 and 44 have output end portions rotatably mounted in suitable bearings 51 and 52, respectively at the rear wall 53 of the differential case. These bearings also can be taper roller or similar bearings that carry both thrust and radial load.

The shafts 42 and 44 each include spiders of four radial shafts or cross shafts fixed to shafts 42 and 44 to rotatably support spider bevel gears, as perhaps best seen in FIG. 2. The radial shafts or cross shafts on shaft 42 are shown at 42A and each are 90° from adjacent shafts. The parallel output shaft 44 has radial shafts or cross shafts 44A thereon.

Figure 4:
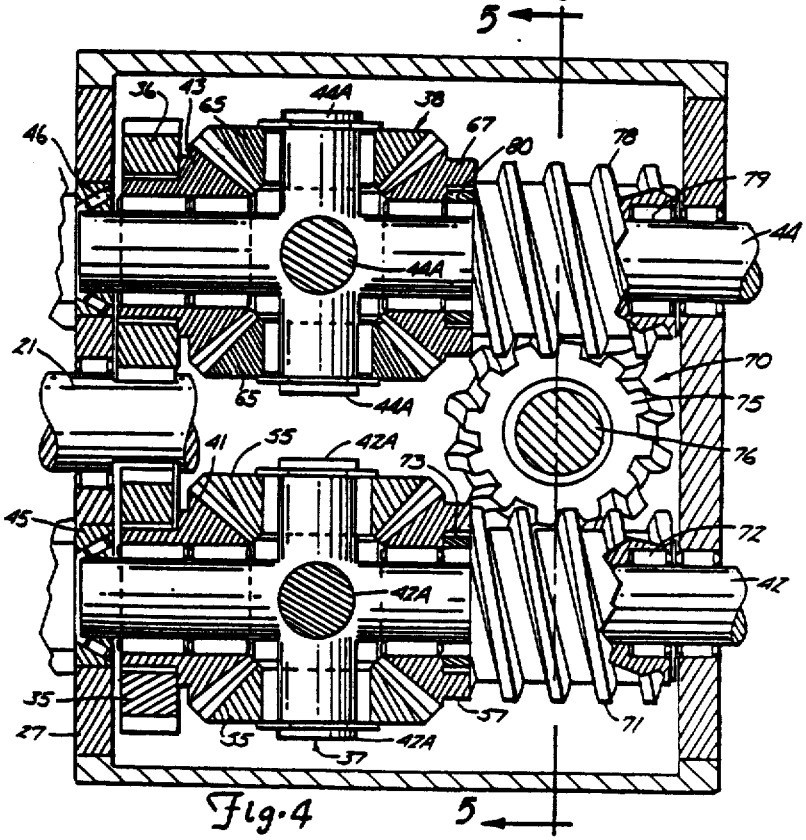
FIG. 4 is an enlarged view of the differential portion of FIG. 2 with parts in section and parts broken away.

FIGS. 3 and 4 show the details of the gear clusters 37 and 38, and the positioning of the radial or cross shafts holding the differential drive orbiting spider bevel gears.

In the gear cluster 37, four orbit spider bevel gears 55 are mounted onto the respective cross shafts 42A on suitable bearings, so that the bevel gears are freely rotatable on the cross shafts 42A. These bevel gears 55 are held in place with suitable snap rings on the cross shafts, and engage the bevel gear 41. Further, the gear cluster 37 includes a control bevel gear 57 rotatably mounted on the shaft 42 on an opposite side of the cross shafts from gear 41 and engaging the bevel gears 55. This control bevel gear 57 is controlled to be nonrotatable except when differential speeds are required. Thus, normally as the bevel gear 41 is rotated, the gears 55 are driven to orbit around the gear 57 and thus drive the shaft 42 through the radial shafts or cross shafts 42A. The shaft 42 is thus rotated at a different speed from the input bevel gear 41 determined by the rotation of the control bevel gear 57. The gear cluster 37 provides a gear ratio of 2:1, that is the output shaft 42 rotates at one-half of the rotational speed of the gear 41 where gear 57 is held.

It can therefore be seen that by controlling the gear 57 so that it is held or rotates at a controlled rate, and in a selected direction relative to the direction of rotation of gear 41 the output speed of the shaft 42 can be likewise controlled and changed.

The gear cluster 38 operates in the same way as explained for the gear cluster 37, and includes orbiting spider bevel gears 65 mounted onto the cross shafts 44A, and a control bevel gear 67 that is rotatably mounted on the output portion of the shaft 44. The control bevel gear 67 is normally held from rotation until differential output speeds of shafts 42 and 44 are required. The gear 67 is controlled in the same way as gear 57.

The control bevel gears 57 and 67 are controlled through the use of a worm and worm gear assembly indicated generally at 70 that provides proportioning of torque between the parallel power paths including the shafts 42 and 44 and as controlled by the differentiating gear clusters 37 and 38.

Figure 5:
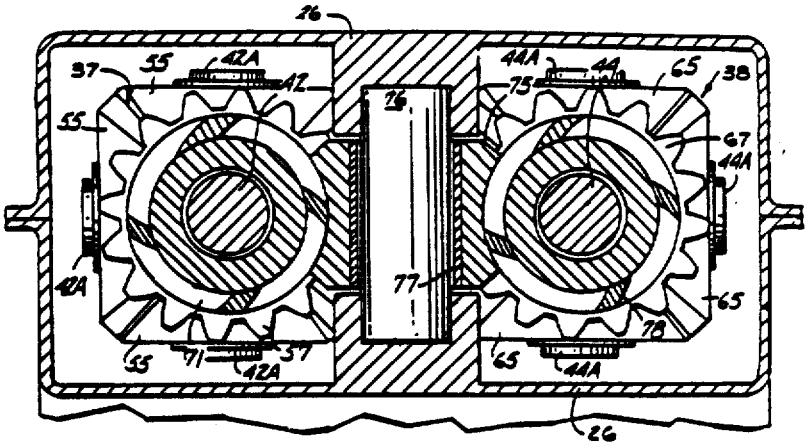
FIG. 5 is a sectional view taken on line 5—5 in FIG. 4.

Reference is made specifically to FIGS. 4 and 5, wherein the worm gear assembly 70 includes a worm (a spiral gear) 71 that is rotatably mounted on suitable bearings 72 on the shaft 42, and which in turn is splined as at 73 to the hub of the control gear 57. Thus, worm 71 becomes a member that is drivably coupled to the control gear 57 and controls rotation of the gear 57. The worm 71 engages a worm gear 75 which is rotatably mounted on a shaft 76 that is suitably supported in the differential housing 26, as shown in FIG. 5. The worm gear 75 is mounted on a suitable bushing 77, and the axis of the shaft 76 is perpendicular to the axes of shafts 42 and 44.

A second worm 78 is rotatably mounted on the shaft 44 on suitable bearings 79, and is splined as at 80 to the hub of the control gear 67 for the second gear cluster 38. The worm 78 also engages the worm gear 75, on a diametrically opposite side of the worm gear from worm 71.

The torque proportioning feature involves the worm gear 75 operating in the gear assembly 70 to engage the two worms 71 and 78. The differential drive operates on the principle that the worm gear cannot drive a worm, but worms can drive a worm gear. Thus it is immediately apparent that the first worm 71 will be prevented from rotation by the worm gear 75 unless the worm 78 is rotating in an opposite direction, and vice versa. That is, the worm 78 will be prevented from rotating unless the worm 71 is rotating in an opposite direction so that the worm gear 75 can rotate on the shaft 76.

The helical angle of the worm can be in the range of 12 to 30 degrees, with the angle of the worm gear being the complement of this angle. The selection of the helix angle is well within the skill of the art and can be based on engineering design decisions.

The output power in the two parallel power paths defined by shafts 42 and 44 is transmitted by the shafts 42 and 44 through suitable universal or constant velocity joint assemblies shown at 85 and 86, respectively, to input shafts 87 and 88 of a final rear axle drive housing 89 (as shown in FIGS. 1 and 2). Two separate bevel gear sets 90 and 91 are mounted in the housing 89, to in turn drive the output axles 92 and 93 in a conventional manner.

The axle shafts 92 and 93 are connected to lateral axle shafts that in turn drive the wheels of a vehicle (not shown) in a normal way.

It can be seen that under normal conditions, one of the axle shafts 92 or 93 cannot turn independently of the other, because they come from a common drive and the control gears 57 and 67 are normally held, and only when the worms 71 and 78 are rotating in opposite direction so that the worm gear 75 can rotate, will differential rotational speed of the output shafts be possible.

Figure 6:
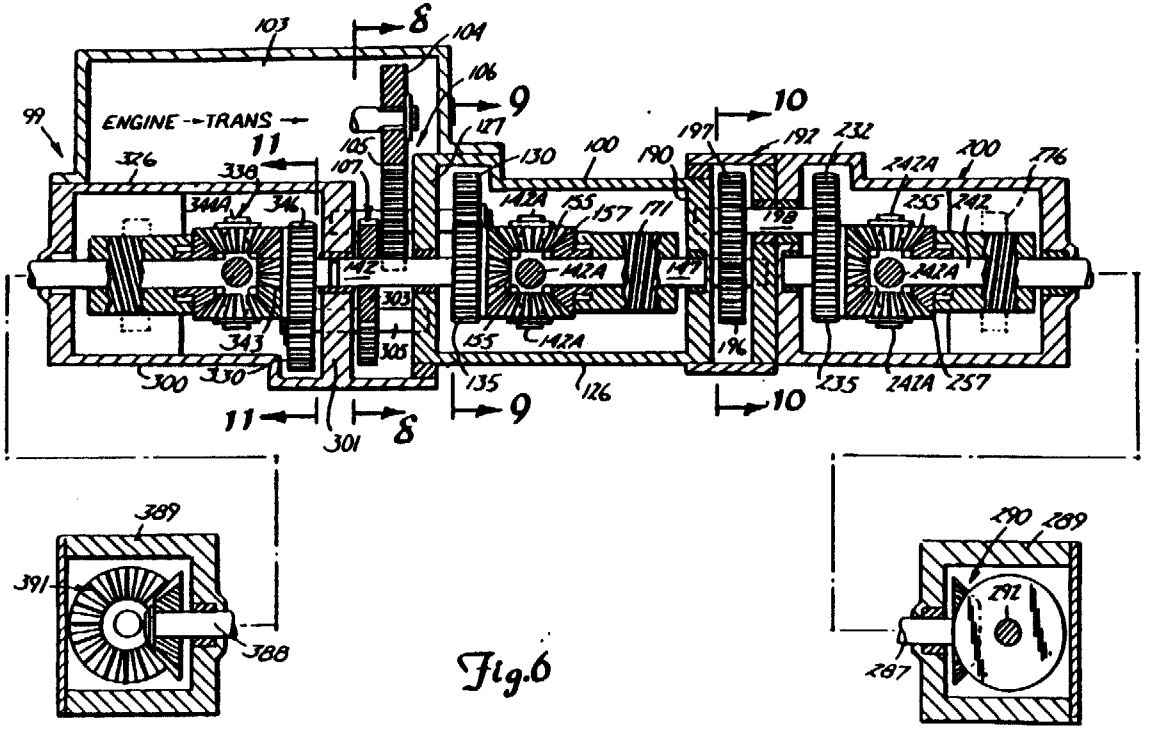
FIG. 6 is a top plan sectional view of a modified differential such as that shown in FIG. 1 including a continuously variable transmission gear arrangement made according to the present invention.

In FIG. 6, a modified differential drive apparatus is illustrated, and the operation is substantially the same as that insofar as the differentiating and torque proportioning of the output shafts is concerned, but in this form of the invention, a variation is made in that it is formed as a mid-differential for four-wheel drive unit, and includes one output shaft that drives rearwardly and another output shaft that drives forwardly for front-wheel drive. In this form of the invention, torque proportioning differential is operationally identical with that shown in FIGS. 1-5 and would be connected to the respective output shafts, one for front-wheel drive and one for rear-wheel drive, and each driving an output differential which would have two output shafts to drive the respective axles. This arrangement is only schematically shown in FIG. 6. However, the concept of the arrangements for front and rear-wheel drives is shown in the previously mentioned application of which this is a continuation-in-part. It is to be understood that the continuously variable ratio transmission construction can be used with any type of differential drive, if desired, but that it is particularly useful with the torque proportioning output differentials for two or four-wheel drive vehicles.

In this form of the invention, an engine indicated schematically at 95 drives a lock-up torque converter 97 which has an output shaft 96 that drives a planetary control gear set 94 of conventional design to provide neutral, drive, reverse and park functions. The planetary control 94 drives an input shaft 98 for the disclosed continuously variable ratio transmission and mid-differential having a case or housing 106.

The input shaft 98 is at the lower portion of the case or housing 106, and has a spur gear 110 drivably mounted thereon that drives a pair of power dividing spur gears 115 and 116, respectively. Gear 110 is splined or otherwise driven by the shaft 98, for example, with Woodruff keys or the like. The drive between the shafts and gears shown herein are conventional, and if not specifically mentioned may be splines or keys. Spur gears 115 and 116 comprise power input gears to a pair of drive control gear sets or clusters, indicated generally at 117 and 118, respectively. The gear sets or clusters 117 and 117 are bevel gear sets and are constructed similarly to the sets shown in FIGS. 1–5, except that in this form of the invention the continuously variable transmission features are added to a following gear cluster arrangement. However, in this form of the invention, the input drive spur gear 115 is splined onto or otherwise drivably attached to a first bevel gear 121 which is rotatably mounted onto a first output shaft 122. This output shaft 122 extends forwardly in this form of the invention, through a front wall 107 of the case 106, and shaft 122 is one of a pair of parallel output or drive shafts. This is one of the parallel power paths that is used with the torque proportioning differential drive, and with the disclosed continuously variable transmission. The gear 116 is splined or otherwise drivable attached onto a bevel gear 123, and the gear 116 and bevel gear 123 are both rotatably mounted onto a second of the parallel output or drive shafts 124.

The drive shafts 122 and 124 each are suitably mounted on bearings 125 and 126, respectively, in the front wall 107 of the case 106, and bearings 131 and 132 at the rear wall 133 of the case. As can be seen, the bearing 126 supports an end of the shaft 124, and the bearing 131 supports an end of the shaft 122, and the shafts extend in opposite directions out of the case 106.

Figure 8:
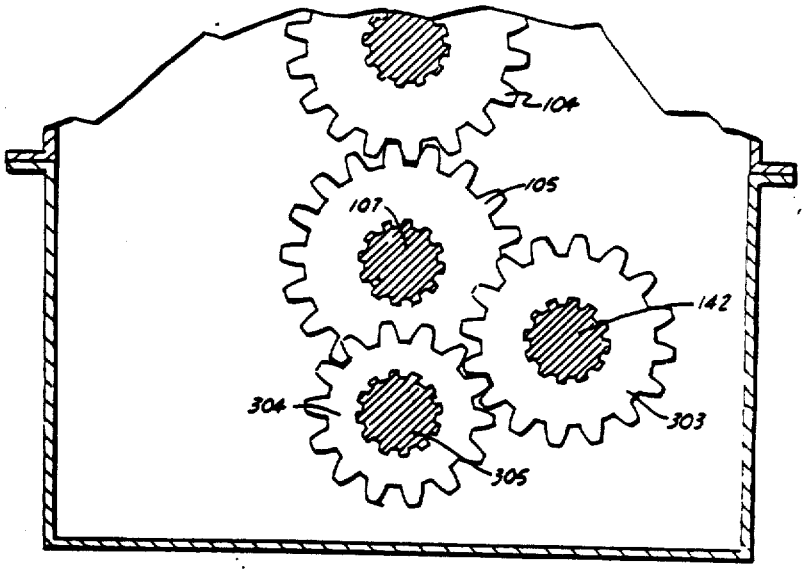
FIG. 8 is an isometric view of the device shown in FIG. 6.

The shafts 122 and 124 each include spiders comprising four radial shafts or cross shafts fixed to the respective shafts 122 and 124 to rotatably support spider bevel gears, similar to that shown in FIG. 2, and as also can be seen schematically in FIG. 8. The four spider or cross shafts on the shaft 122 are indicated at 122A, and each are 90° from the other. The shaft 124, which is for the rear torque proportioning differential drive, has radial shafts or cross shafts 124A thereon. In the bevel gear cluster or set 117 that comprises a drive control gear set, there are four orbit or spider bevel gears 135 mounted onto the shafts 122A on suitable bearings. The bevel gears 135 are freely rotatable on the cross shafts 122A. These bevel gears 135 are held in place with suitable snap rings on the cross shafts and engage the bevel gear 121.

The drive gear set or cluster 117 also includes a control bevel gear 137 which is a double-faced bevel gear, having gear teeth 137A and 137B, so the gear 137 is common to the cluster 117 and a second ratio control gear set that will be explained. The bevel gear 137 is rotatably mounted on the shaft 122, on suitable bearings or bushings.

The bevel gear set or cluster 118 includes orbiting spider bevel gears 145 rotatably mounted on the cross shafts 124A, and includes a control bevel gear 147 which also is a double-ended or common bevel gear having teeth 147A engaging gears 145 and teeth 147B engaging a second control gear cluster mounted in series with the first cluster 118. Gear 147 is rotatably mounted on the shaft 124.

The rotation of the gears 137 and 147, when controlled, either for proportioning torque through a torque proportioning worm gear assembly similar to that shown in FIGS. 1–5, or when being controlled to provide a continuously variable gear ratio, determines the output drive ratio between the input bevel gears 121 and 123 and the output shafts 122 and 124. The control bevel gears 137 and 147 comprise side gears for second gear ratio control gear sets or clusters 157 and 158, respectively. These second gear clusters are also differentiating bevel gear sets, but operate in a different manner to provide for continuously varying the output gear ratio between the input side bevel gears 121 and 123 and the output shafts 122 and 124. This ratio control is done through two separate controls, one for differential drive and the other for a variable output drive ratio.

As can be seen the gear cluster 157 includes a control gear housing assembly 159, that comprises a central hub or spider 160 that is rotatably mounted on shaft 122 with suitable bearings. The spider hub 160 has spider shafts 170A positioned at 90° from each other and extending radially outwardly therefrom. The spider shafts 170A in turn mount bevel spider or orbit gears 165 thereon that engage the second section or gear teeth 137B of the side gear 137 and which are rotatably mounted onto the spider shafts 170A. The spider shafts 170A have outer end tongues or lugs 170B that have parallel sides and over which a ratio control gear drive housing section 163 is drivably mounted. The drive housing section 163 is an annular ring type housing that surrounds the spider hub 160 and shafts 170A, and which has a central opening that is of size to fit over the spider gears 165.

The outer surface of the gear housing section 163 is provided with spur gear teeth 164, that extend all the way around the housing.

Additionally, the ratio control gear cluster 157 includes a differential control bevel gear 167 that operates in substantially the same manner as the control bevel gear 57 shown in FIGS. 1–5. The control bevel gear 167 is normally held stationary, as was previously explained, except during torque proportioning or differentiating drive that can occur through the control for the bevel gear 167 to permit differential movement between the shafts 122 and 124.

The ratio control gear cluster 150 includes a central spider hub 170 that has spider shafts 170A, which together make a spider assembly 171 that is rotatably mounted onto the shaft 124 through a suitable bushing or bearing. The spider shafts 170A have spider or orbit bevel gears 175 rotatably mounted thereon which are adapted to engage the gear portion 147B of the side or control gear 147. The spider gears 175 will rotate on the spider shafts 170A whenever necessary because of the loads and control functions required.

The spider shafts 170A have tongues or lugs 170B which receive slots on the interior opening of a gear drive housing 173 that surrounds the spider assembly 171, and which can be used for controlling motion of the spider assembly about the shaft 124. The outer periphery of the control gear housing 173 has spur gear teeth 174 thereon.

The gear set or cluster 158 has a control bevel gear 177 on the output side thereof which drivably engages the gears 175, and which is also rotatably mounted on the shaft 124. Gear 177 is normally non-rotatable except in differential movements that will permit differences in rotational speed between shafts 122 and 124, as was previously explained in connection with the worm and gear drive in FIGS. 1–5.

Figure 7:
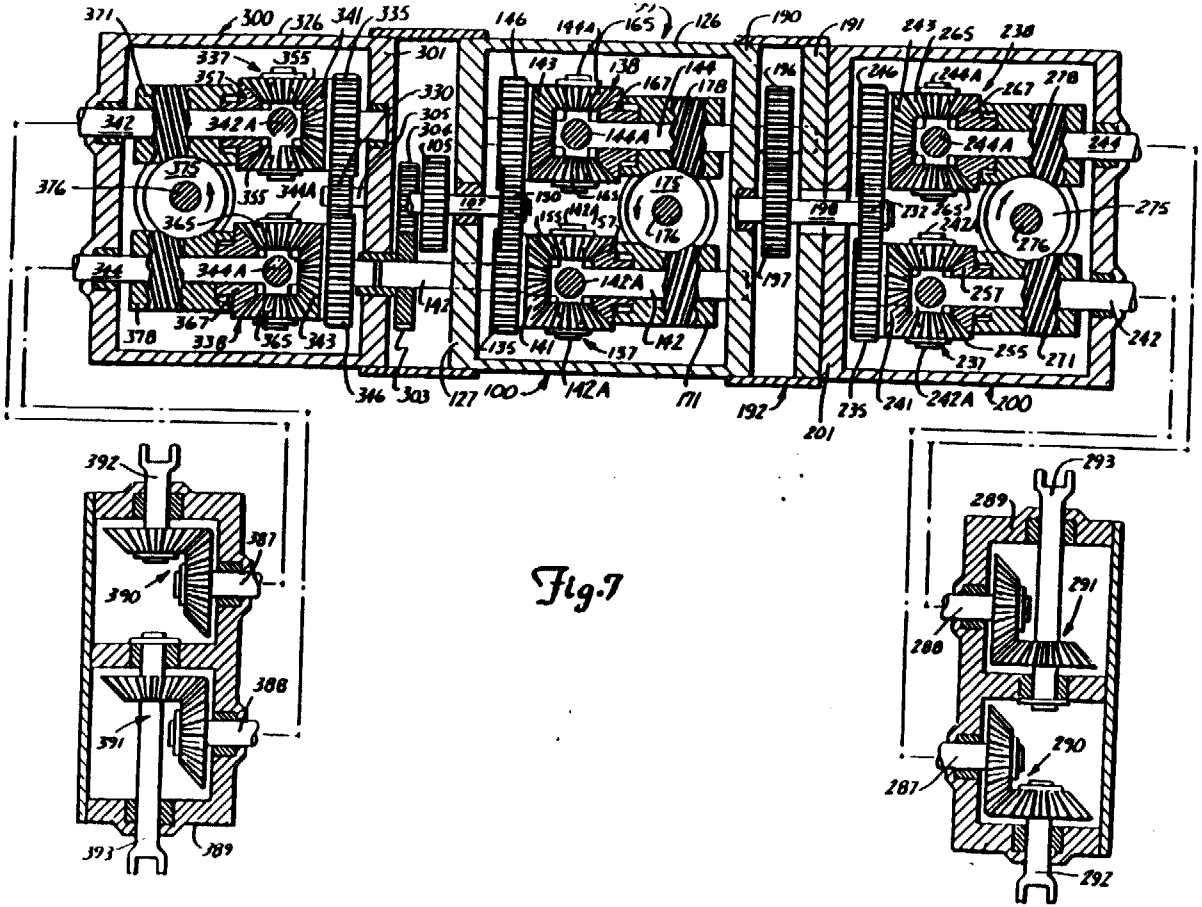
FIG. 7 is a sectional view thereof taken as on generally a long line 7—7 of FIG. 6.

The ratio control gear housing sections 163 and 173 are controlled to permit changes in rotational speed of the control gears 173 and 147, relative to the bevel gears 167 and 177 permits providing a continuously variable ratio transmission. The control permits continuously varying the output speed of shafts 122 and 124 relative to the speed of the input shaft 98. The rotation of the gear housing sections 163 and 173 are controlled and adjusted through the use of a transmission control gear and motor. As can be seen in FIGS. 6, 7 and 8, a support shaft 180 is rotatably mounted in the transmission case generally parallel to the shaft 98. The shaft 180 is above the gear sets 157,158, while the input shaft 98 is on the lower side of the input gear sets or clusters, as shown in FIG. 3. The shaft 180 has a transmission ratio control gear set 181 rotatably mounted thereon. The transmission control gear set includes a spur gear 162 that drivably engages both of the gears 164 and 174 formed on the outside of the gear housing sections 163 and 173. The gear housing sections 163 and 173 are thus ring type gears of the drive control gear sets or clusters 157 and 158. The ratio control gear housing sections 163 and 173 cannot rotate unless the gear 162 permits such movement and also rotates.

The gear 182 can control rotation of both of the drive ratio control gear housing sections simultaneously. The gear set 181 has a worm gear 183 splined to the hub thereof, or integrally formed therewith, and this worm gear 183 is drivably associated with a worm 185 that in turn is driven by the output shaft of a variable speed, reversible motor 186 that can be either a high torque electric motor, or if desired can be a hydraulic motor that is suitably controlled. The motor 186, of course, will be mounted in a suitable bracket shown schematically at 187 to the case 106 in a conventional manner, and the output shaft of the motor can be as long as necessary to provide the necessary clearance for the various parts.

However, the variable gear ratio of the transmission can be controlled positively by operating the motor 186 and gear 182 to permit the drive ratio control gear housing sections 163 and 173 to be rotated and thus control the output drive ratio through the control gears or side gears 137 and 147. The ratio of drive to shafts 122 and 124 through the associate spider gears and shaft changes if the ratio control gears are permitted to rotate at different speeds. The rotation of the output shafts 122 and 124 thus can be varied in relation to the speed of rotation of the gears 121 and 123 by controlling the speed of rotation of gears 137 and 147, respectively.

The torque proportioning function between the parallel power shafts 122 and 124, which as shown are for front and rear wheel drives, respectively, is accomplished by the use of a worm and worm gear assembly 190 which operates in exactly the same way as the worm gear assembly indicated at 70 in FIGS. 1–5.

The differential control gear 167 of the drive ratio control cluster 157 as shown has a worm 191 that is shown only schematically in section. The worm 191 is rotatably mounted on the shaft 122 on suitable bearings or bushings, and is splined as at 193 to the differential control gear 167. The worm lead (right or left hand) can be selected for directing the thrust in optimum direction for good engineering design. The worm 191 engages a worm gear 195 that is rotatably mounted on a shaft 196, which is suitably mounted in the gear case. Because shaft 180 is positioned above the shaft 196, the support for shaft 196 will come in underneath shaft 180 from the rear wall of the case, or will be made so that the shaft 180 will pass through the support.

A second worm 198 is rotatably mounted on the shaft 124 and is splined as at 200 to the control gear 177 for the second drive ratio control gear cluster 158. The worm 198 also engages the worm gear 195 on a diametrically opposite side of the worm gear 195 from the worm 191.

These worms and worm gear provide the torque proportioning and differential drive feature, operating through assembly 190. The differential drive operates on the principle that a worm gear cannot drive a worm, but worms can drive worm gears. Thus, it is apparent that the first worm 191 will be prevented from rotation by the worm gear 195 unless the worm 198 is rotating in an opposite direction. This works in the inverse, as well. The torque differential caused by a tendency of one driven wheel to spin will be resisted and drive torque will be proportioned.

As previously stated in relation to FIGS. 1–5, the helical angle of the worms can be in the range of 12°–30°, with the angle of the worm gear being the complement of the worm angle. The selection of the helix angle desired is within skill of the art, that is, it is an engineering decision.

The torque proportioning control will thus operate so that there can be torque proportioning between the shafts 122 and 124. A rear drive torque proportioning differential indicated at 202 is connected to the shaft 124 for the rear wheel drive. The differential 202 can be the same as that shown in FIGS. 1–5. The differential 202 will drive an axle assembly indicated at 203 that is also identical to that shown in FIGS. 1–5.

Additionally, the output shaft 122 drives a torque proportioning differential 205 that would be the same as that shown in FIGS. 1–5 of the present invention except the direction of rotation would be selected to be appropriate for front-wheel drive, and the lead angle of the torque proportioning control worms could be changed to direct thrust from the worms in proper direction, which in turn will drive a front axle 206 that can be constructed to have steering and constant velocity joints connected to the individual wheels of the vehicle to permit the vehicle to be steered.

The transmission ratio control motor 186 is controlled by suitable controls 210 that can be microprocessor on, off, directional and speed adjustment controls responsive to input sensors such as rpm or speed sensors 211, sensing the engine speed. The control 210 provides signals to drive the motor 186 in either direction of rotation and to vary the speed as desired, so that the output drive ratio can be changed. It can immediately be seen that by varying the rates of rotation of the drive ratio control gear housing sections for the drive ratio gear sets, the variation in the drive ratio between the input rpm of shaft 98, and the output rpm's of shafts 122 and 124, which comprise the parallel output power shafts, can be changed as desired, and by suitable sensors a smooth change in drive ratio can be achieved from a low gear effect to a straight through or overdrive effect.

In the form shown, with the motor 126 stopped to hold stationary the ratio control gear housing sections through the worm-worm gear arrangement, the output drive ratio is two-to-one, that is, the output shafts 122 and 124 will be rotating at one-half of the speed of the input shaft.

In a specific embodiment that may aid in understanding the operation, the input spur gear, namely the gears 110, and also 115 and 116 are each 27-tooth 2.25 pitch diameter spur gears. The drive ratio control housing section spur gears 164 and 174 have 38 teeth, and the ratio control spur gear 182 for the drive ratio control has 22 teeth.

The side bevel gears 135, 145, 137, 147, and 167, 177 all have 27 teeth, and the orbit or spider bevel gears 135, 145, 165 and 175 all have 18 teeth.

The drive ratio control worm gear 183 has 12 teeth, and the drive ratio control worm 185 on motor 186 is a quadruple thread 180° and 26′ helix. Both the worm gear and worm have one-inch pitch diameter and provide a six-to-one gear ratio.

The torque proportioning worm gear 195 has 18 teeth with a two-inch pitch diameter, and the worms 191 and 198 are 1.5 pitch diameter, sextuple thread worms with a 26°, 34′ helix. A chart of the gear ratios follows as Chart I:

CHART I

| Gear | No-Teeth | Pitch Diameter (inches) |
|---|---|---|
| | Spur Gears | |
| 110 | 27 | 2.25 |
| 115 | 27 | 2.25 |
| 116 | 27 | 2.25 |
| 164 | 38 | 3.167 |
| 174 | 38 | 3.167 |
| 182 | 22 | 1.833 |
| | BEVEL GEARS | |
| 121, 123, 137 147, 167, 177 | 27 | 2.25 |
| 135, 145, 165, 175 | 18 | 1.5 |
| | DRIVE RATIO CONTROL | |
| 183 | 12 | 1 |

The continuously variable transmission which is shown also is a mid-differential assembly in FIGS. 6, 7 and 8 and has a drive ratio of two-to-one. It is called a mid-differential assembly because it provides differential control between front and rear wheel drive differentials. Assuming, for example, that the torque proportioning differential 202 also has a drive ratio of two-to-one (or the front wheel drive differential also does) in an illustrative progression of the variable ratios, as shown in Chart II below. The engine input rpm at idle is assumed to be 600 rpm, and typical engine speeds are illustrated.

The ratio control worm rpm is the same as the output speed of the transmission ratio control motor 186, which speed can be controlled by sensing the engine rpm, for example (or even manually controlled), and this, of course, can allow infinite variations in ratio including manual selection of mid-range drive ratios, and selection of higher or lower engine rpms at which the final drive ratio for cruising is reached. The drive axle rpm listed is the speed of the output drive axle, either front or rear, the two differentials each having two-to-one reduction ratio, provide a four-to-one ratio to the axles so that the output shaft driving axle assembly 203 or 206 would be one-fourth of the input rpm of the shaft 98. The ratio between the worm and worm gear for the transmission ratio control is six-to-one, so that the ratio control gear 182 (called a pinion in Chart II) rotates at one-sixth of the worm rotation, and that also is one-sixth of the rpm of the ratio control motor 186.

CHART II

| Engine Input RPM: | Ratio Control Gear Housing RPM: (164, 174) | Ratio Control Pinion RPM: (182) | Ratio Worm RPM: (185) | Drive Axle RPM: | Final Drive Ratio: |
|---|---|---|---|---|---|
| 600 | 300 | 518 | 3108 | 0 | Infinite |
| 700 | 285 | 492.1 | 2952.6 | 32.5 | 21.5 |
| 800 | 270 | 466.2 | 2797.2 | 65 | 12.3 |
| 900 | 255 | 440.3 | 2641.8 | 97.5 | 9.2 |
| 1000 | 240 | 414.4 | 2486.4 | 130 | 7.7 |
| 1200 | 210 | 362.6 | 2175.6 | 195 | 6.2 |
| 1400 | 180 | 310.8 | 1864.8 | 260 | 5.4 |
| 1600 | 150 | 259 | 1554.0 | 325 | 4.9 |
| 1800 | 120 | 207.2 | 1243.2 | 390 | 4.6 |
| 2000 | 90 | 155.4 | 932.4 | 455 | 4.4 |
| 2200 | 60 | 103.6 | 621.6 | 520 | 4.23 |
| 2400 | 30 | 51.8 | 310.8 | 585 | 4.1 |
| 2600 | 0 | 0 | 0 | 650 | 4.0 |
| 3000 | | | | 750 | 4.0 |

The ground speed of the vehicle, assuming a 26 inch wheel diameter, varies, for example, from about 10 mph at 1000 rpm and the 2600 rpm ratio given would be approximately a 50 mph speed. A 300 rpm speed would be approximately 57.9 mph.

It also is apparent that the ratio control worm can be replaced with a non-slip variable speed pulley and belt, that is non-slip, by either directly driving a worm with the belt, or replacing the worm and worm gear with the belt and pulley arrangement. Belts also could be used to drive ratio control housing section 167 and 174.

Again, the ratios in Chart II assume that both of the shafts 122 and 124 are rotating at the same speed and differentiation is not required. Differential drive is an added feature.

Figure 11:
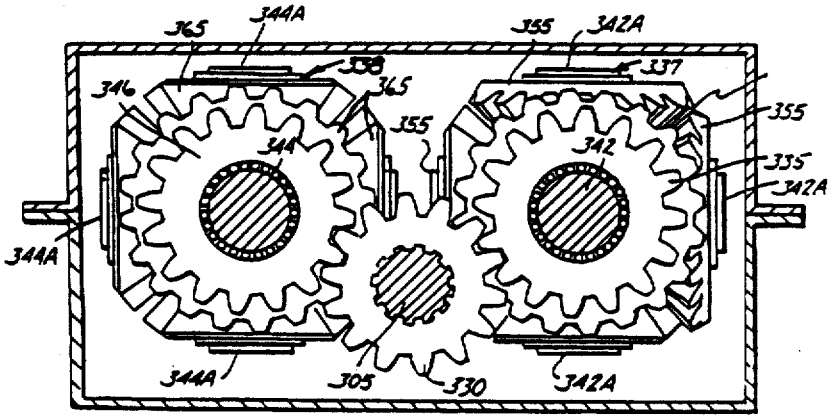
FIG. 11 is an isometric view of the device of FIG. 9.
Figure 9:
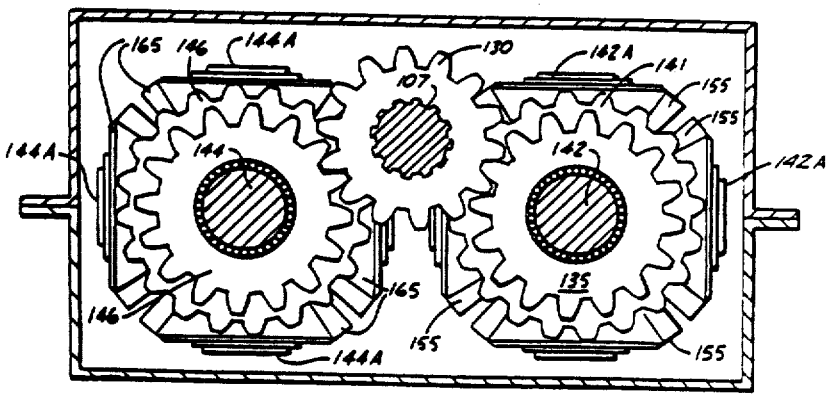
FIG. 9 is a modified top plan sectional view of a second form of the continuous variable transmission utilizing planetary gearing for the gear set.
Figure 10:
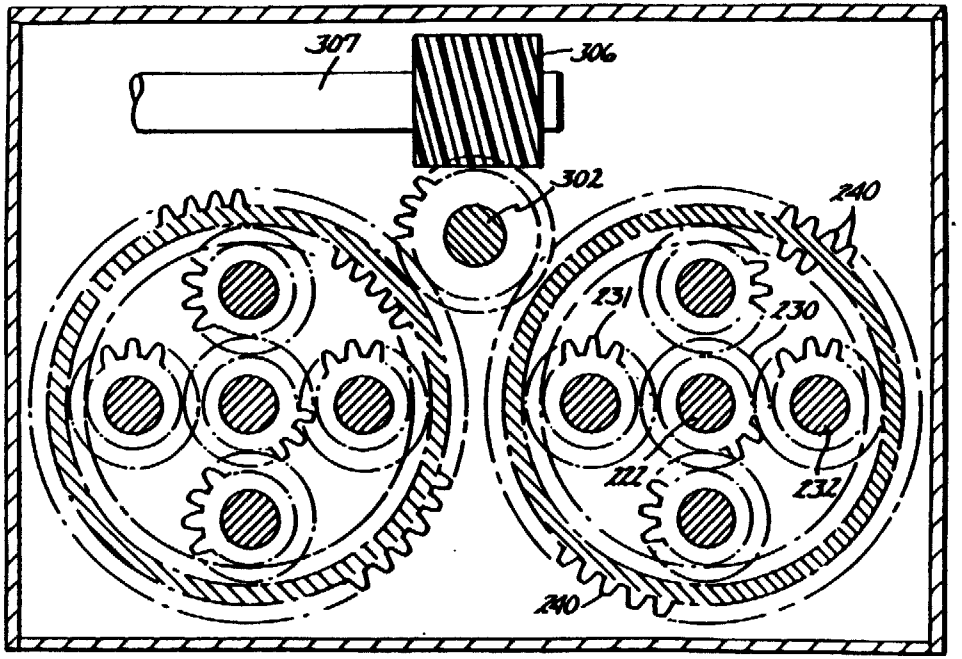
FIG. 10 is a sectional view thereof taken substantially on line 10—10 in FIG. 9.

In a modified form of the invention which illustrates the interchangeability of the continuously variable transmission concept with or without the torque proportioning, using a gear set or cluster comprising a planet gear assembly is shown in FIGS. 9, 10 and 11.

In FIG. 9, an outer case 216 comprises a differential-torque proportioning continuously variable transmission assembly that has a forward wall 217 that supports an input drive shaft 213, that includes an input drive spur gear 214, which in turn drives input spur gears 219 and 220 which are rotatably mounted with respect to the respective output shafts 222 and 224. The gears 219 and 220, respectively, comprise input gears which drive through planetary type gear sets, including a drive ratio control section 225 that is associated with the output shaft 222, and a drive ratio control section 226 that is associated with the output shaft 224. These sections are for controlling the ratio in the continuously variable transmission arrangement shown in FIGS. 9–11. A control gear set or section indicated at 227 is associated with the control for proportioning torque and for differentiation and is arranged with shaft 222. A drive control gear set or section 228 is associated with the shaft 224 for controlling the differential and torque proportioning features.

The ratio control gear sets, as stated, comprise planetary gear sets with planet gears, sun gears and planet carriers that also comprise gear housing sections. The ratio control section 225 includes a sun gear 230 that is drivably coupled, either by splining or making a unit, to the spur gear 219, and is rotatably mounted relative to the shaft 222.

The sun gear 230 engages multiple planet gears (four spur gears as shown) indicated at 231 which are rotatably mounted onto planet shafts 232, which shafts in turn are fixedly mounted in a planet shaft carrier 233. The shaft carrier 233 is rotatably mounted onto the shaft 222.

The planet gears 231 also drivably engage an interior gear 235A having spur gear teeth formed on the interior of a ratio control planetary gear carrier housing or ring 235. An output set of planet gears 237 are rotatably mounted on the outer ends of shafts 232 from planet gears 231.

Additionally, the gear housing 235 for the set of planet gears has an external spur gear 240 thereon for drive ratio control purposes, for providing the continuously variable ratio control.

The planet gears 237 drivably engage a control gear 245 (a sun gear) that in turn is drivably mounted (keyed) on the shaft 222 as at 247. Gear 248 has internal teeth 249 which are drivably engaged by planet gears 237, as well. The control gear 248 and its internal teeth 249 comprise a part of the drive control section 227. The control gear 248 has a hub 250 that is rotatably mounted on shaft 222 and is drivably coupled to the torque proportioning worm and worm gear differential control. The drive, when gear 248 is held from rotation, goes from gear 219 to sun gear 230, to planet gears 231 and, if gear housing 235 is held from rotation, through shafts 232 and carrier 233 (which must rotate about shaft 222), and then through gears 237 that react with gear 245 to drive sun gear 245 and shaft 222.

A second ratio control section 226 is identically constructed to the section 225, and it rotates in the same direction and is associated with the shaft 224. It includes a sun gear 260 that is drivably connected to the input spur gear 220, and rotatably mounted on the shaft 224. The sun gear 260 drives multiple planet gears 261 that are rotatably mounted on planet shafts 262 that in turn are fixedly carried by a planet shaft carrier 263 that is rotatably mounted on the shaft 224 in suitable bushings or bearings. The planet gears 261 also drivably engage an internal gear 265A formed in the interior of a gear housing 265. An output set of planet gears 267 are rotatably mounted on the shafts 262 at opposite ends from the gears 261.

An external ratio control spur gear is formed as shown at 270 on the exterior of the housing 265.

The planet gears 267 drivably engage a sun gear 275 which is drivably mounted on shaft 224. This sun gear 275 drives shaft 224 and comprises an output gear. A drive control gear 278 has internal teeth 279 which are drivably engaged by planet gears 267. The gear 278 comprises a part of the drive control section 224. The gear 278 has a hub 280 that is drivably mounted (splined) on the output torque proportioning and differential control worm for the shaft 224.

The torque proportioning and differential control is shown generally at 290 and comprises a first worm 291 that is drivably mounted onto the hub 251 of the gear 248 for the drive control section 227. The worm 291 is rotatably mounted with respect to the shaft 222, which comprises an output shaft for a forward differential when used with a four-wheel drive unit. A suitable spacer or thrust washer 292 can be provided between the rear walls of the case 216 and the worm 291, if desired.

Torque proportioning control for the shaft 224 comprises a worm 296 that is rotatably mounted on the shaft 224 and is splined with respect to the hub 280 of the gear 278 for the drive control section 228 that is associated with the shaft 224. This worm 296 is spaced from the rear wall of the case 216 with a suitable thrust washer of spacer 298.

A worm gear 299 is rotatably mounted on a shaft 300 that is suitably supported in the gear case 216, and engages both of the worms 296 and 291, to control differentiation or rotational movement between shafts 224 and 222 as previously explained, and also to permit drive and control proportioning of torque between the two output shafts as previously explained.

The continuously variable transmission aspects of the present invention are obtained by controlling the speeds of rotation of the ratio control gear housing sections 235 and 265. This is done by mounting a shaft 302 above the gear housings, in suitable bearings (not shown) and including a ratio control drive gear assembly indicated generally at 303 that is rotatably mounted on the shaft 302 (the shaft 302 is mounted as shown in FIG. 6, for example). The ratio control gear 303 includes a spur gear section 304, and a drivably coupled worm gear 305 that either can be splined to the gear 303 or formed as a unit. The rotation of the worm gear is controlled by a worm 306 that is drivably mounted onto a shaft 307 that comprises the output shaft of a reversible, variable speed motor 308 of suitable design as previously explained. The motor 308 is positioned laterally of the case 216 and powered in a suitable manner, and by regulating the speed of rotation of the motor 308, various drive ratios can be obtained through the planetary gear sets or clusters that can be varied in ratio as to the input and output shaft speeds.

In the specific embodiment of FIGS. 9–11, in understanding the operation, the input spur gears, namely the gears 214, 217 and 220, are each 27-tooth 2.5 pitch diameter spur gears. The drive ratio control housing section spur gears 240 and 270 have 44 teeth, and the variable ratio control spur gear or pinion 303 for the drive ratio control has 21 teeth.

The sun gears and planet gears 230, 231, 237, 245, 260, 261, 267 and 275 all have 12 teeth, and the internal gears 235A, 265A in the gear housings and control gears 249 and 279 have 36 teeth.

The drive ratio control worm gear 305 has 15 teeth, and the drive ratio control worm 306 driven by motor 308 is a quadruple thread 18° and 26′ helix. The worm gear 305 has a one and one-fourth pitch diameter and worm 306 has a one-inch pitch diameter to provide a seven and one-half to one gear ratio.

The torque proportioning worm gear 299 has 21 teeth with a 2.5 inch pitch diameter, and the worms 291 and 296 are 1.5 inch pitch diameter, sextuple thread worms with a 26°, 34′ helix. A chart of the gear ratios follows as Chart III.

CHART III

| Gear | No-Teeth | Pitch Diameter (inches) |
|---|---|---|
| | Spur Gears | |
| 214 | 30 | 2.5 |
| 220, 219 | 30 | 2.5 |
| 230, 260 | 12 | 1.0 |
| 231, 261 | 12 | 1.0 |
| 245, 275 | 12 | 1.0 |
| 237, 267 | 12 | 1.0 |
| 235A, 265A | 36 | 3.0 |
| 249, 279 | 36 | 3.0 |
| 240, 270 | 44 | 3.66 |
| 303 | 21 | 1.75 |

CHART III-continued

| Gear | No-Teeth | Pitch Diameter (inches) |
|---|---|---|
| | WORM GEARS | |
| 305 | 15 | 1.25 |
| 299 | 20 | 2.5 |
| | WORMS | |
| 306 | quad-thread 18*, 26' helix | 1.0 |
| 291, 296 | sex. thread 26*, 34' helix | 1.5 |

A typical progression indicating the input rpm and the rpm of the ratio control gears as well as the control electric motor rpm is reproduced Chart IV that follows. Again, electronic sensing of enginer rpm and control of the control motor rpm in other ways can allow a large variety of variations. Gear ratios shown in FIGS. 9, 10 and 11 are set forth in Chart III, and the information of Chart IV shows the final drive ratio.

Using the continuously variabe transmission and differential shown in FIGS. 9–11 as a mid-differential, with a ratio of 1:1 using the gear sizes shown, and a front and rear differential ratio of three-to-one so that the output drive axles rotate at one-third the speed of output shafts 222 and 224, a wide final drive ratio can be obtained by controlling motor 308 and then the ratio of the continuously variable transmission.

As shown, each ratio control gear housing (gears 240, 270) has 44 teeth, and ratio control pinion (spur gear 303) has 21 teeth to give a 2.09:1 ratio. The ratio control worm (306) to worm gear (305) ratio is 7.5:1.

CHART IV

| Engine Input RPM: | Ratio Control Gear Housing RPM: (240, 270) | Ratio Control Pinion RPM:(303) | Ratio Worm RPM: (306) | Drive Axle RPM: | Final Drive Ratio | Speed MPH: |
|---|---|---|---|---|---|---|
| 600 | 200 | 418 | 3135 | 0 | Infinite | 0 |
| 700 | 186.66 | 390.38 | 2928 | 46.67 | 15.0:1 | 3.6 |
| 800 | 173.33 | 362.5 | 2719 | 93.34 | 8.57 | 7.2 |
| 900 | 160 | 334.6 | 2510 | 140 | 6.43 | 10.8 |
| 1000 | 146.66 | 306.7 | 2300 | 186.67 | 5.36 | 14.4 |
| 1100 | 133.33 | 278.8 | 2091 | 233.34 | 4.71 | 18.0 |
| 1200 | 120 | 250.9 | 1882 | 280 | 4.29 | 21.6 |
| 1300 | 106.65 | 223.1 | 1673 | 326.7 | 4.0 | 25.2 |
| 1400 | 93.33 | 195.2 | 1464 | 373.34 | 3.75 | 28.9 |
| 1500 | 80 | 167.3 | 1254 | 420 | 3.57 | 32.5 |
| 1600 | 66.66 | 139.4 | 1045 | 466.67 | 3.43 | 36.1 |
| 1700 | 53.33 | 111.5 | 836 | 513.34 | 3.31 | 39.7 |
| 1800 | 40 | 83.6 | 627 | 560 | 3.21 | 43.3 |
| 1900 | 26.66 | 55.75 | 418 | 606.66 | 3.13 | 46.9 |
| 2000 | 13.33 | 27.86 | 209 | 653.34 | 3.06 | 50.5 |
| 2100 | 0 | 0 | 0 | 700 | 3.0:1 | 54.1 |

Ground speeds can be calculated, and again using a wheel diameter of 26 inches on the vehicle, at 700 engine rpm, the speed would be approximately 3.6 mph, and at 2000 rpm, the speed would again be at approximately 50 mph.

Obtaining a higher output rpm at a lower engine rpm can be accomodated easily, by changing the ratios as desired. Again, in this form of the invention the ratio control gear arrangement can be replaced with variable pulley and belt control to eliminate the electric motor if desired.

Additionally, the continuously variable transmission can be used for a single-ended output shaft, that then could be used for driving either a front or rear differential, or this type of transmission could be used without torque proportioning, and thus could be suitable for a wide variety of vehicles including all terrain vehicles, motorcycles and the like.

Figure 12:
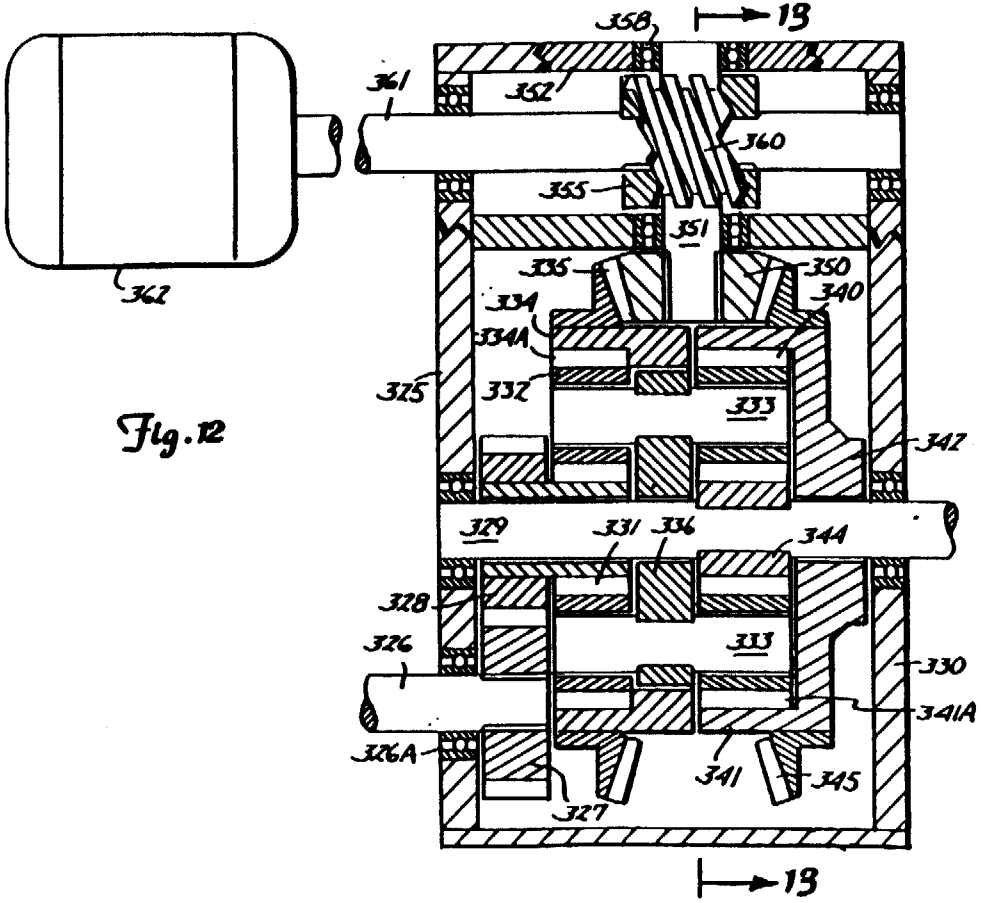
FIG. 12 is a side sectional view of a further modified form of the invention showing a split planetary drive for a single output shaft application.

FIG. 12 illustrates a first form of the single output continuously variable transmission, and includes an outer housing 325, which has an input shaft 326 leading from a power source that drives a spur gear 327 in a normal manner. This is mounted in a suitable bearing 326A in the front wall of the case 325, and the spur gear 327 in turn drives a second spur gear 32b that is rotatably mounted on a shaft 329 that extends all the way through the case and out the rear wall shown at 330. The spur gear 328 in turn is drivably connected to a sun gear 331 that is rotatably mounted with gear 328 on the shaft 329, and the sun gear 331 drives multiple planet gears 332 that are rotatably mounted onto planet gear shaft 333. The gears 332 drivably engage an internal gear shown at 334A of an outer gear housing for the gear clusters, which housing is shown at 334 and provides a housing for the gear clusters that can be controlled as to rotation for varying the output ratio between the input shaft and the output shaft. The gear housing 334 is a ratio control gear housing, or section, and has an outer large bevel gear 335 around the periphery thereof. Additionally, the planet shafts 333 are mounted fixedly in a planet shaft carrier 336 that comprises a type of spider. The carrier or spider 336 is rotatably mounted on the shaft 329 on suitable bearings or bushings. The planet shafts extend parallel to the output shaft 329, and at the rear end thereof, that is, the end opposite from the planet gears 332, there are second output planet gears 340 rotatably mounted on the shafts 333. The output planet gears 340 drivably engage an internal gear indicated at 341A of a gear housing 341 that comprises a portion of the ratio control housing, and this housing 341 is rotatably mounted on the shaft 329, through a hub 342. Additionally, the planet gears 340 drivably engage a sun gear or central gear 344 that is keyed to or otherwise drivably mounted on the shaft 329. Shaft 329 then extends outwardly from the case through the rear wall 330 as previously mentioned. Of course, the various shafts have suitable taper roller bearings on them, generally.

Figure 13:
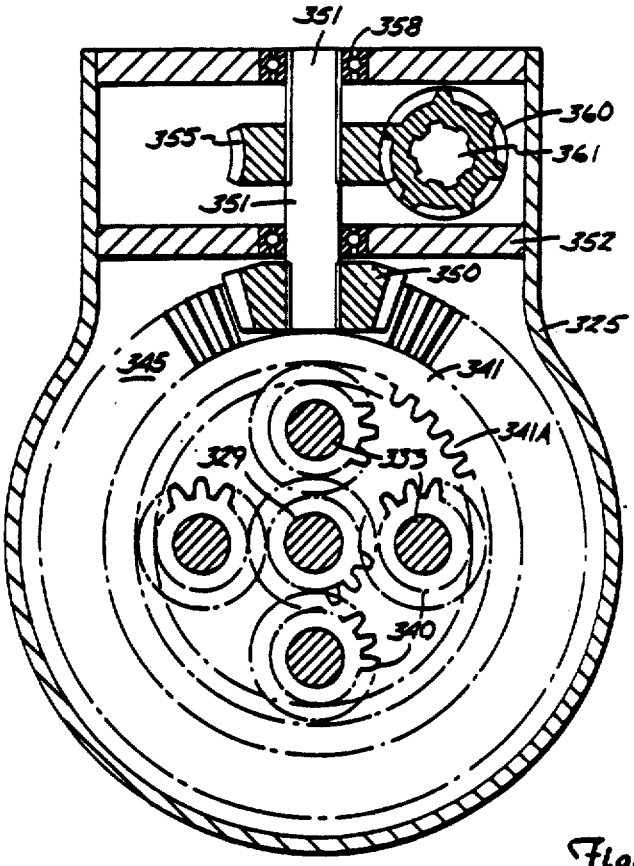
FIG. 13 is a schematic front sectional view thereof taken substantially on line 13—13 of FIG. 12.

The gear housing 341 has an outer bevel gear 345, fixedly mounted thereon, and facing the gear 335. The gears 335 and 345 are spaced apart so that a ratio control pinion 350 can engage both of these gears, and the pinion is mounted onto a ratio control shaft 351 that, as can be seen in FIG. 13, for example, is suitably supported in cross members 352 of the gear housing 325, and has a worm gear 355 drivably mounted thereon as well. The worm gear is spaced axially along the shaft 351 from the pinion 350.

Suitable bearings shown at 358 can be used for mounting the shaft 351 in the cross members 352. The worm gear 355 is controlled by a worm 360 that is drivably mounted onto a shaft 361 that comprises the output shaft of a ratio control motor 362.

In this form of the invention, the drive ratios can be varied by controlling and driving the motor 362, to turn the pinion 350 and permit the outer ratio control gear casings or housings 334 and 341 to rotate and thereby control the output ratio between the input shaft 326 and the output shaft 339.

Using the same size sun gear and planet gears, as well as the same size spur gears 327 and 328, a one-to-one ratio will be achieved if the outer housings 334 and 341 are held from rotation. To bring the output shaft back to zero rpm when the engine is idling, would require a slower speed of the pinion 350 than that of a pinion 392 shown in FIG. 15, for instance, because the two gear housings 334 and 341, which comprise the ratio control gear housings, would be rotating in opposite directions. Thus the ratio can be changed more readily with less speed of the control motor 362. Varying the speed of control motor 362 in response to the engine speed, which would be the speed of rotation of shaft 326, can provide an infinite gear ratio.

Figure 14:
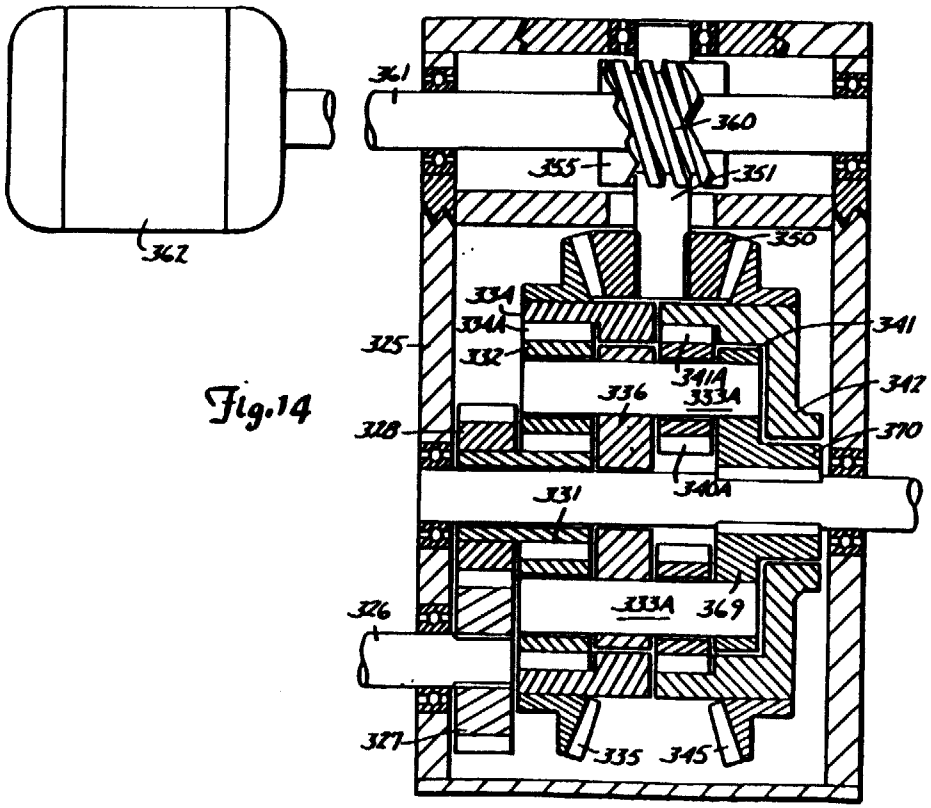
FIG. 14 is a side elevational view similar to that of FIG. 12, and showing a further modified planetary continuously variable transmission made according to the present invention.

FIG. 14 shows an alternative arrangement, wherein the planetary shafts shown at 333A (the input spur gears and planet gears are identically numbered with the form shown in FIG. 12) are carried in a second planet shaft carrier 369, as well as carrier 336. The carrier 369 and its hub 370 are fixedly mounted to the output shaft 329. Gear housing 341 that has a hub 342 that is rotatably mounted on the hub 370 of the planet shaft carrier 369.

The planet gears 340A are merely engaged with the internal gear 341A of the gear housing 341, and do not engage any sun gear. Other than that, the arrangement is identical including the use of the control motor, and a ratio control pinion 350.

In the embodiment shown in FIG. 14, the same arrangement of the gears is as shown in FIG. 13, and has the same size sun gears and planet gears, the resistance to rotation is provided by the pinion 350, and the antireverse characteristics of worm gear drives, so that when the control motor is not running, the outer gear rings and gear housings will be held.

If desired, the gear housing 341 could be attached to the case, and disengaged from the pinion 350, so there would not be any gear drive there. The arrangement shown in FIG. 14 gives an alternative or different output ratio from the form shown in FIGS. 12 and 13. With a sun gear to annular gears (334A, 341A) ratio of three-to-one, the output shaft 329 to input shaft 326 ratio is three-to-one, as well. A one-to-one ratio is obtained with the FIG. 12 form.

Figure 15:
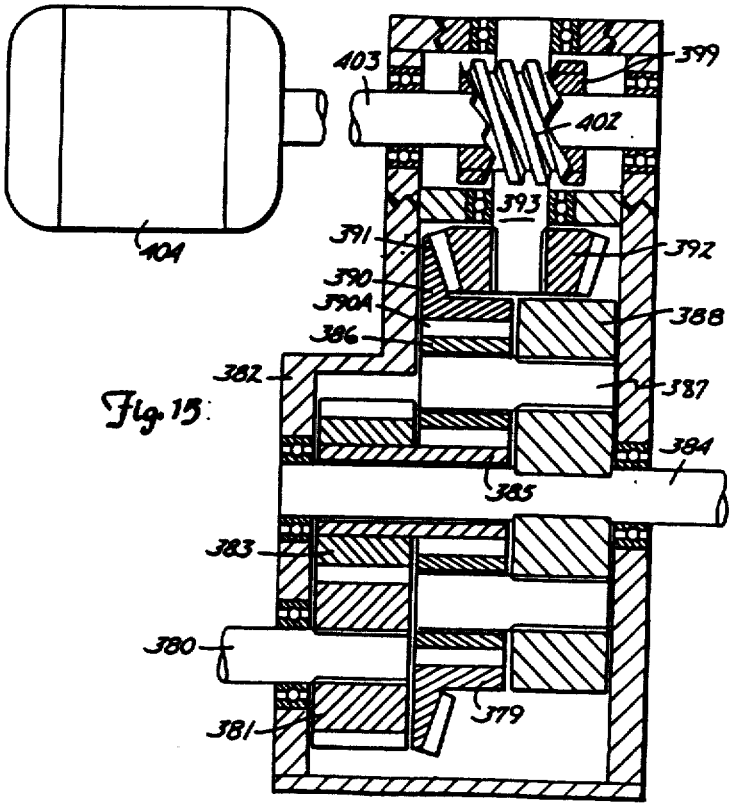
FIG. 15 is a still further modified form of the invention utilizing a single output shaft with a single planetary drive.
Figure 2:
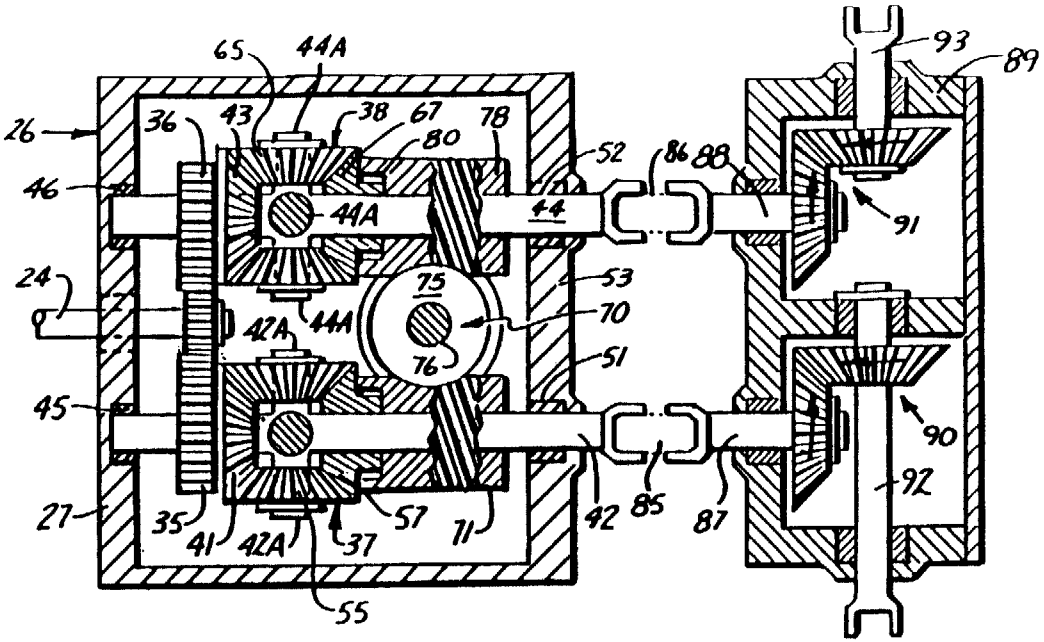
Figure 1:
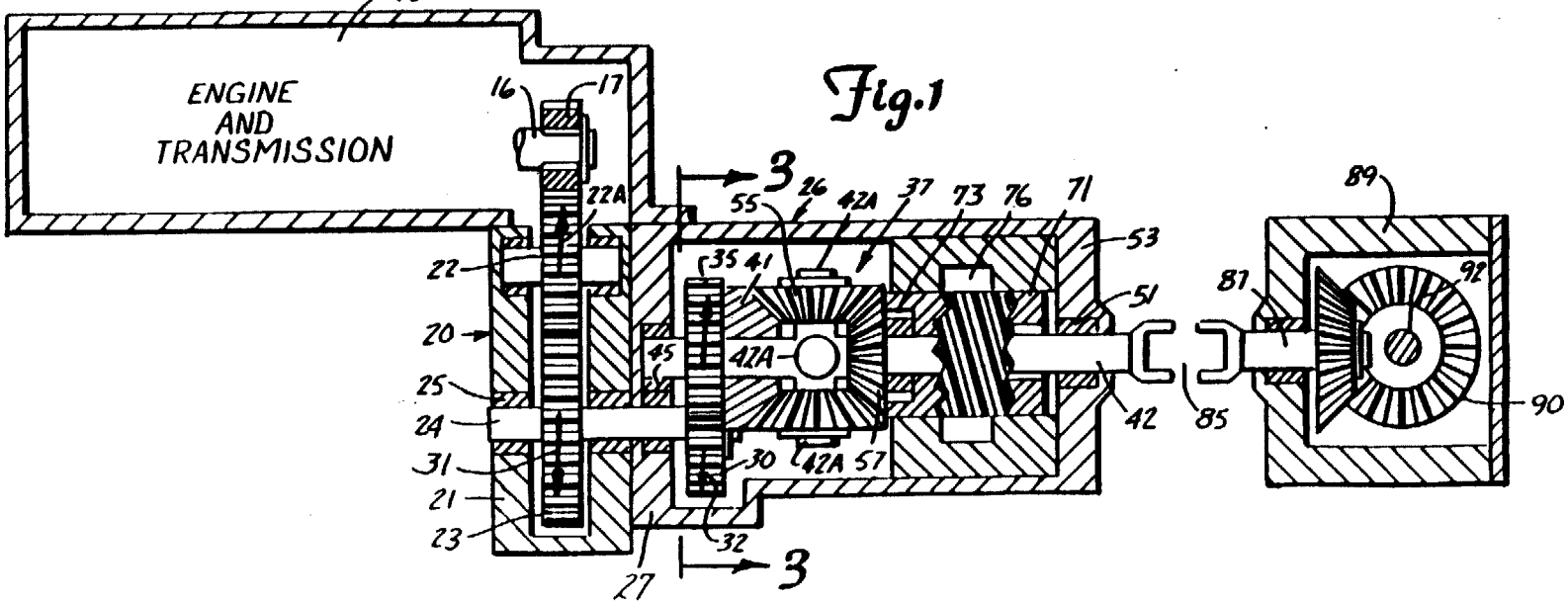
Figure 3:
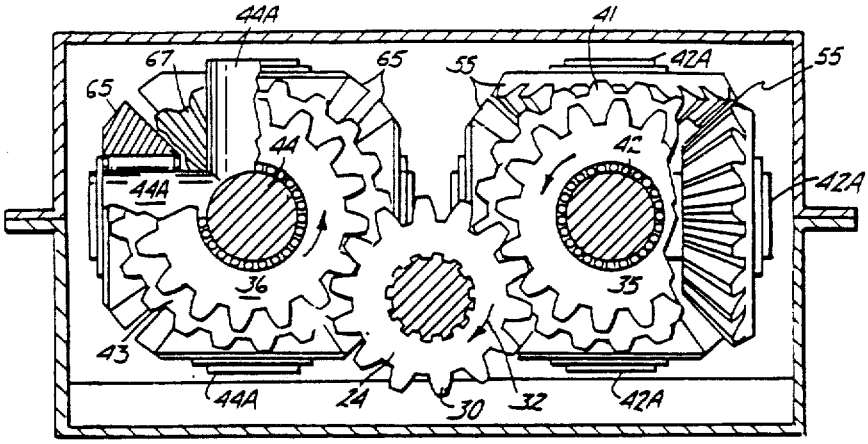
Figure 4:
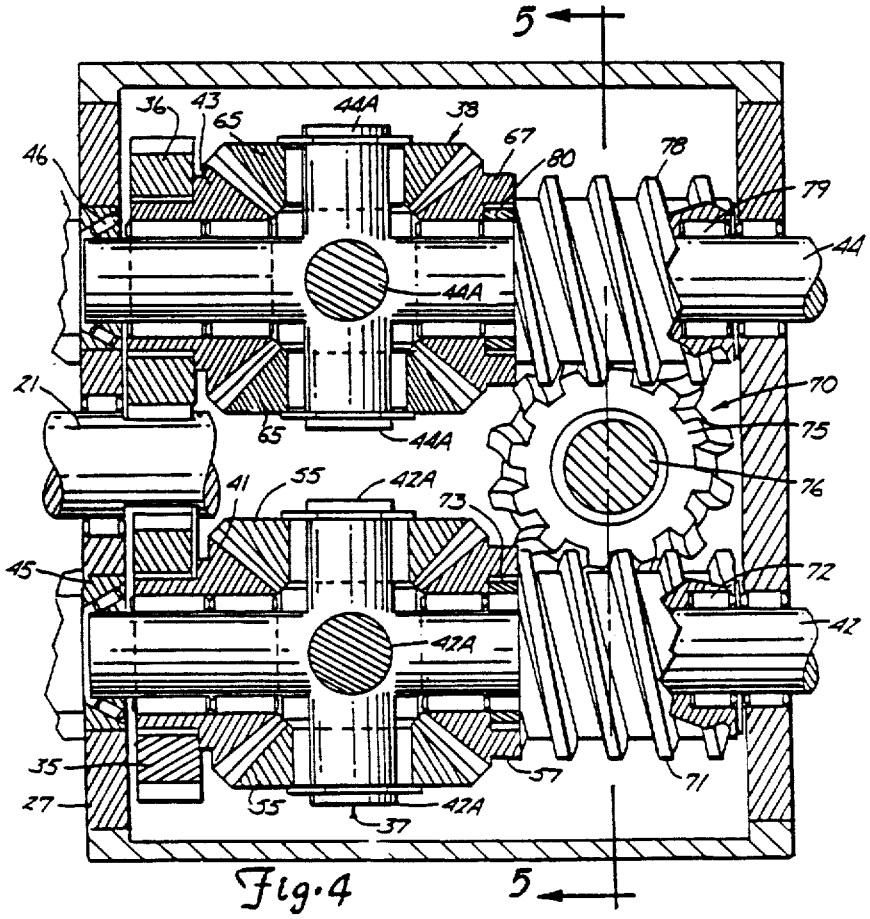
Figure 5:
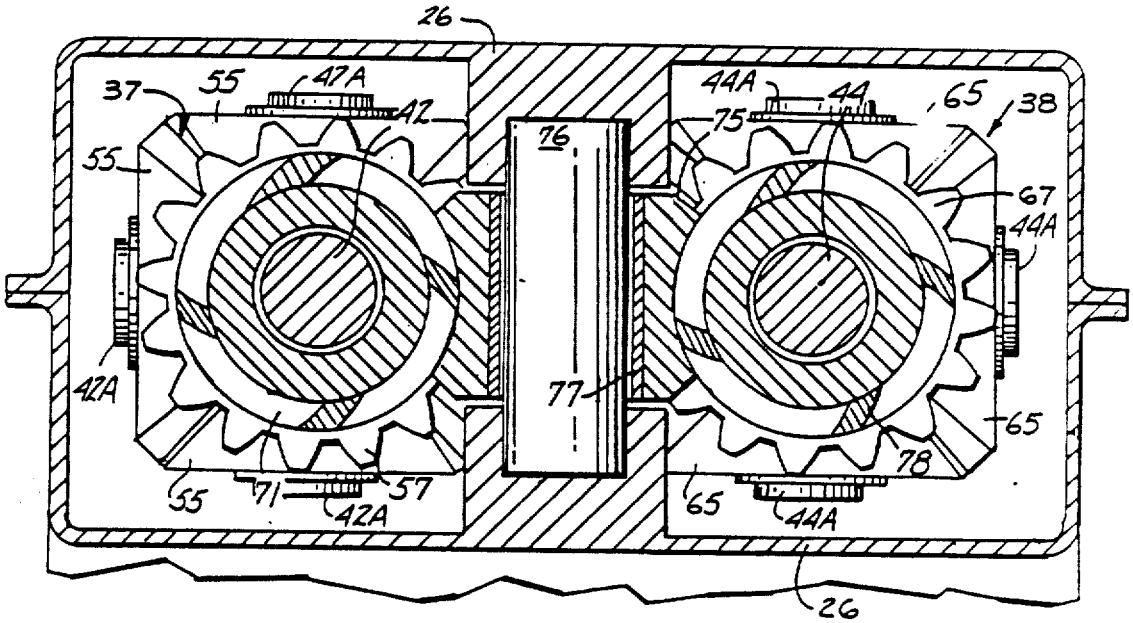
Figure 6:
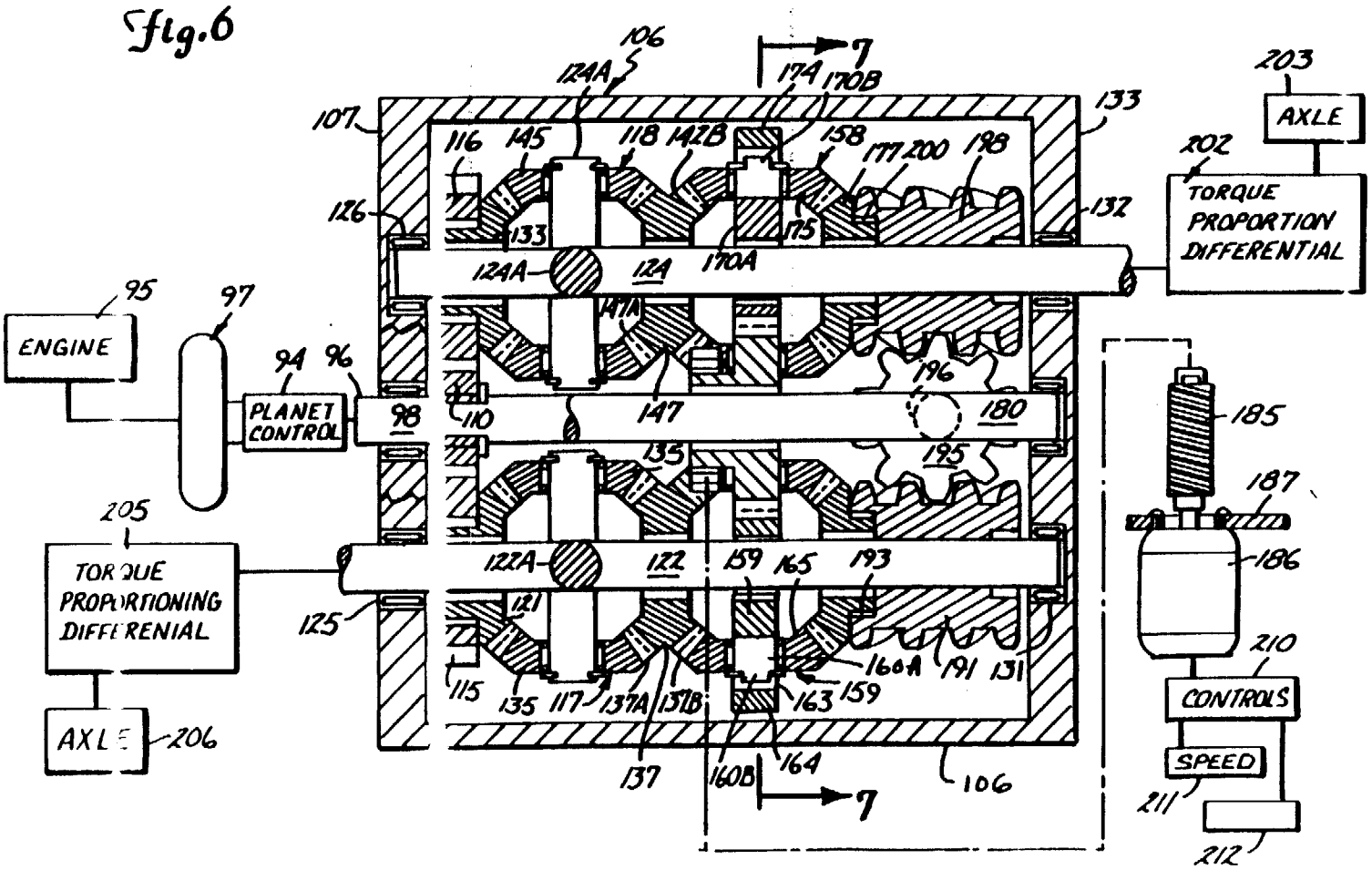
Figure 7:
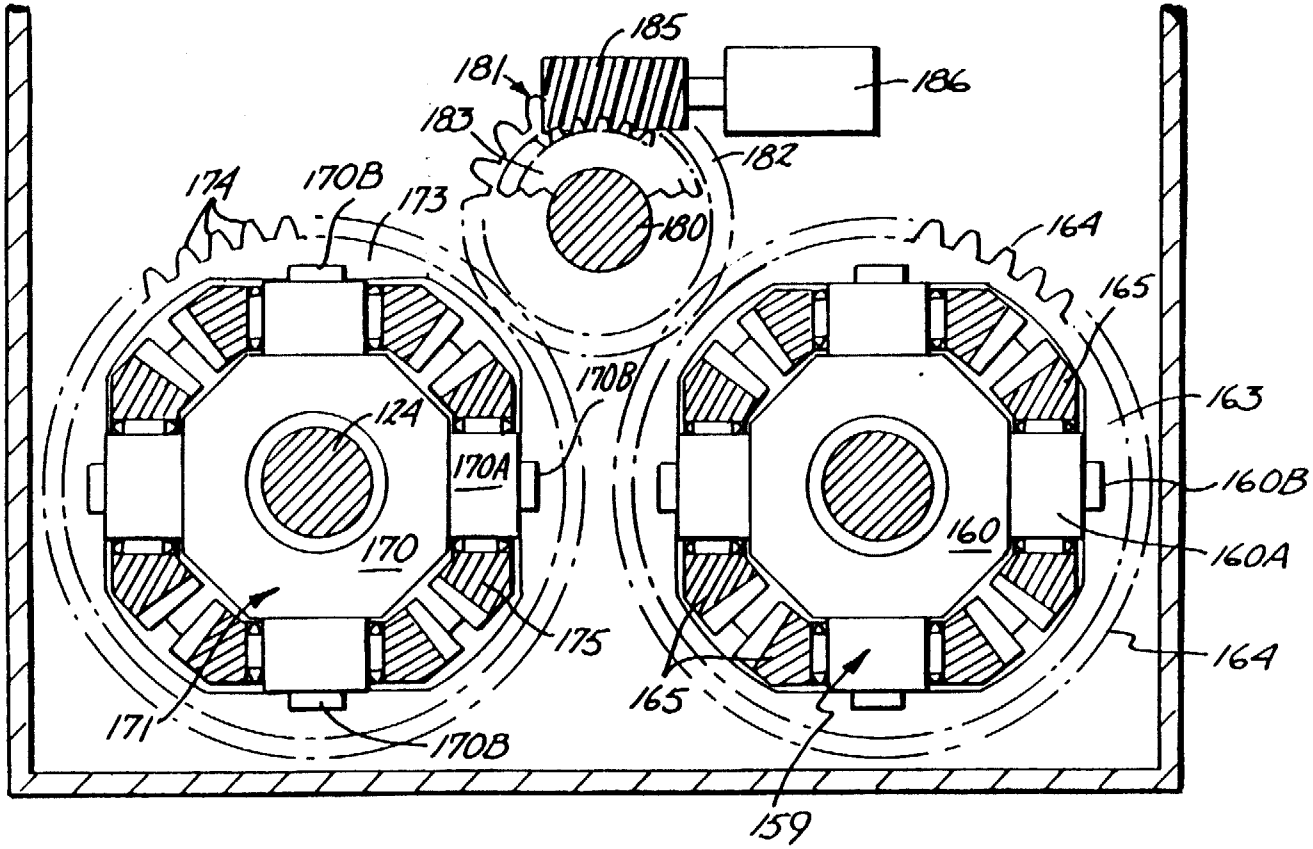
Figure 8:
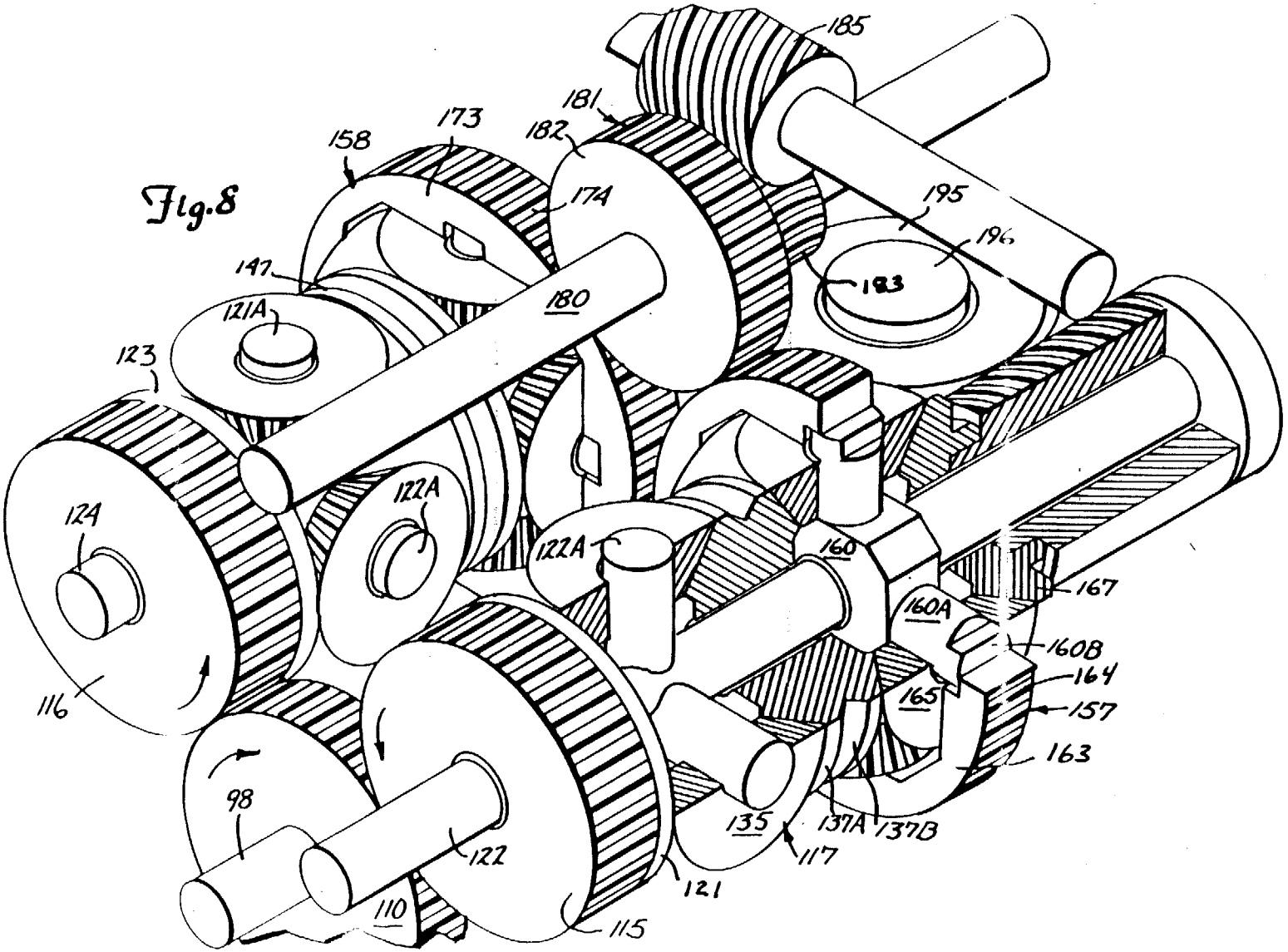
Figure 9:
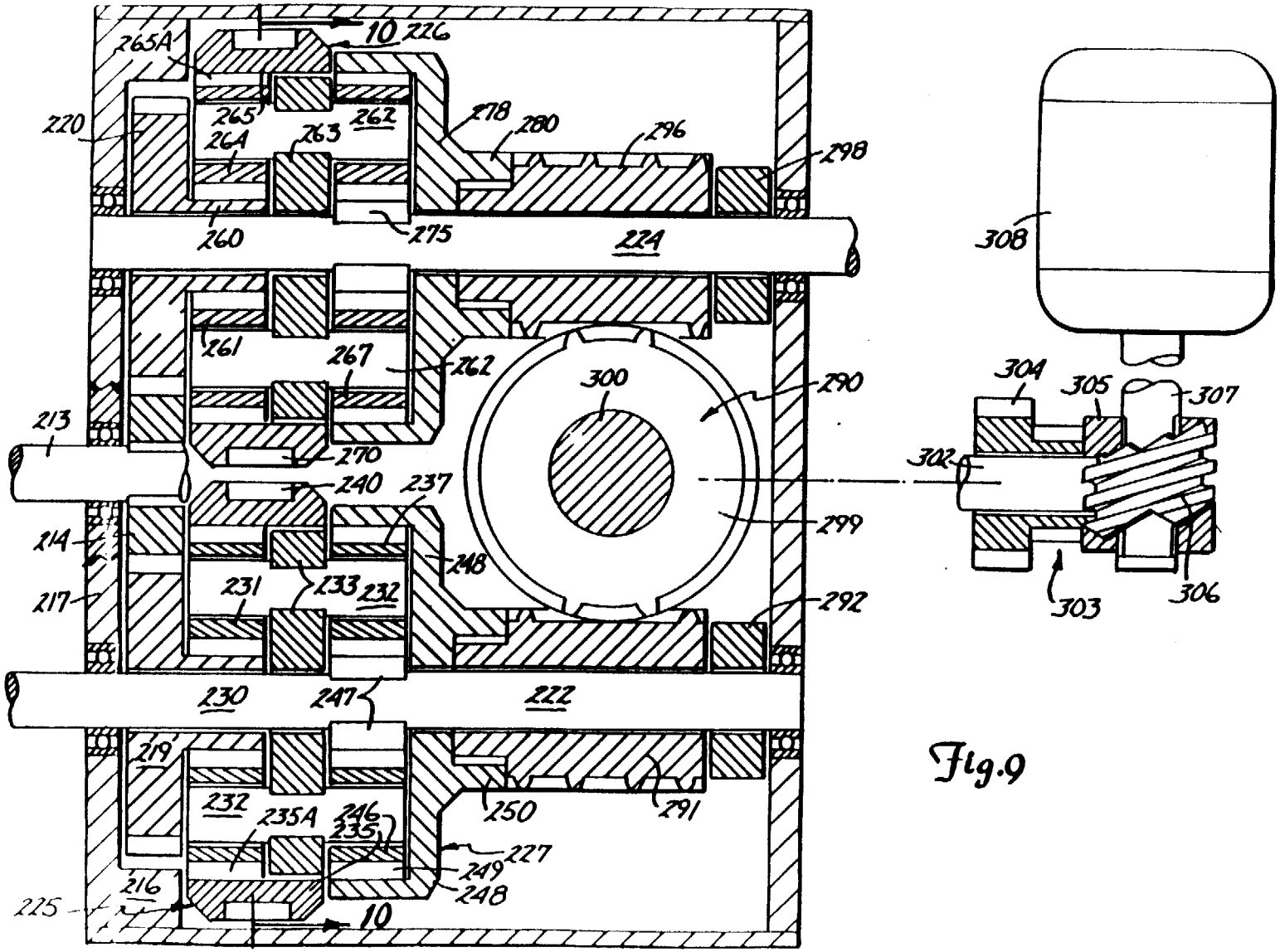
Figure 10:
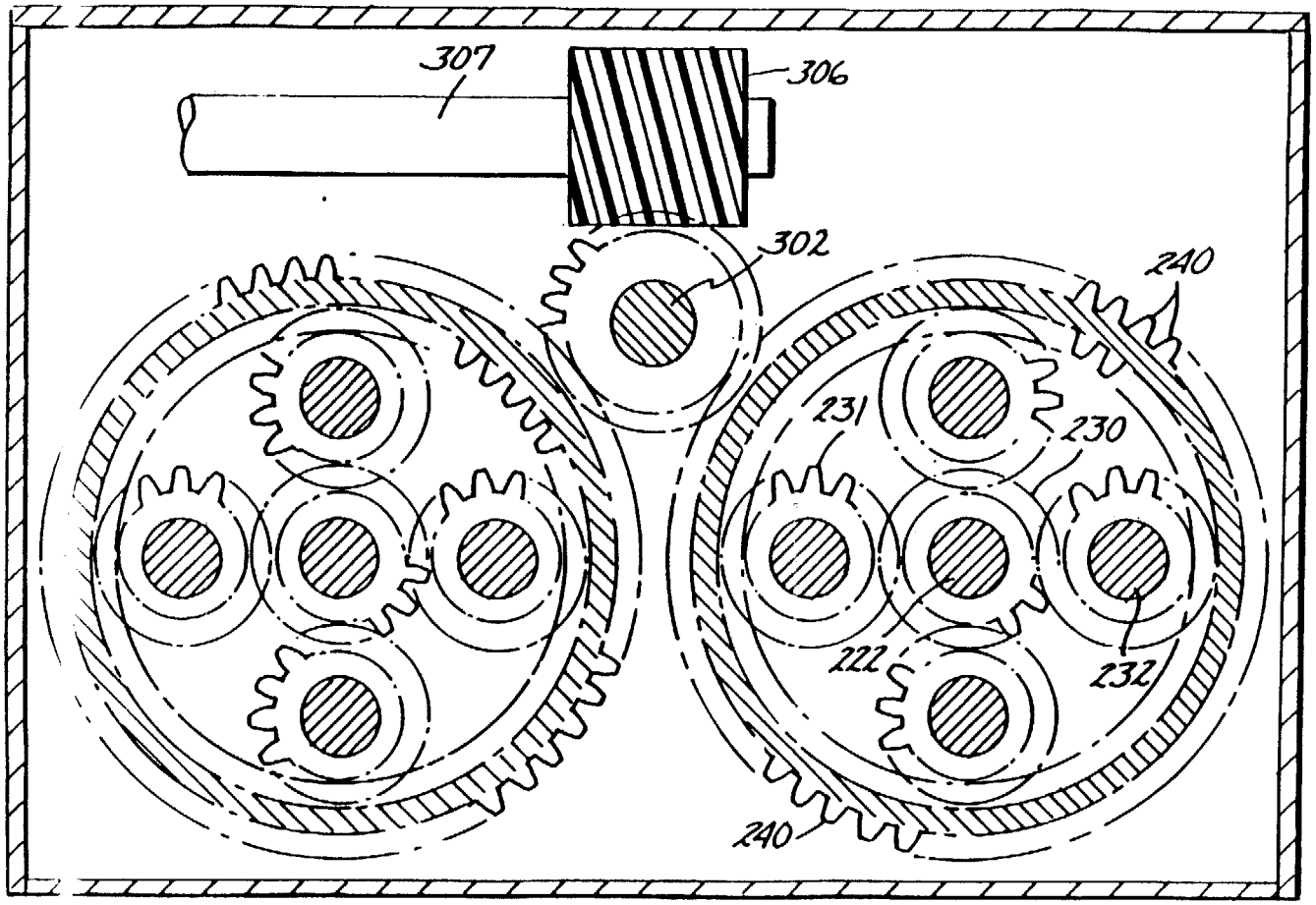
Figure 11:
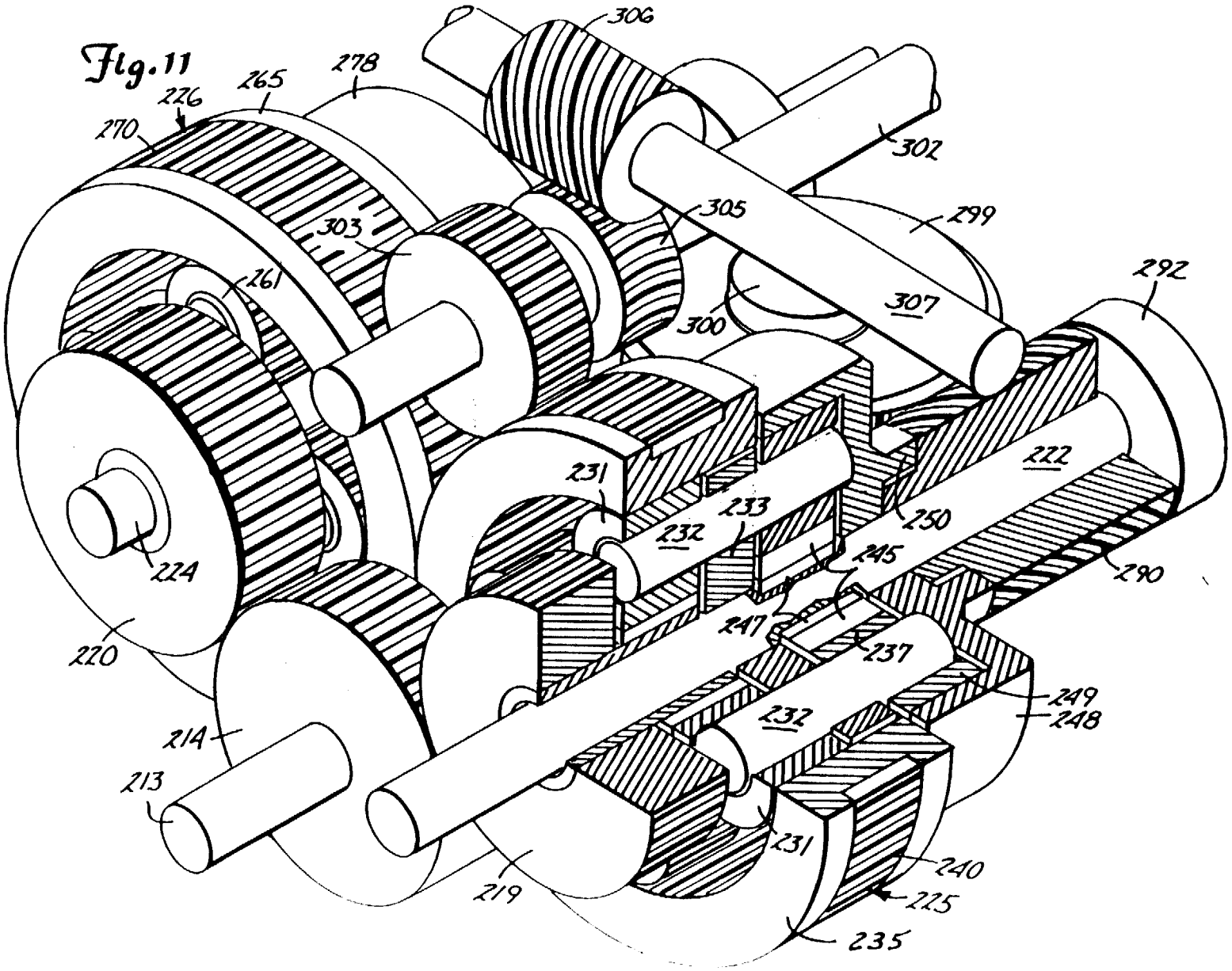
Figure 12:
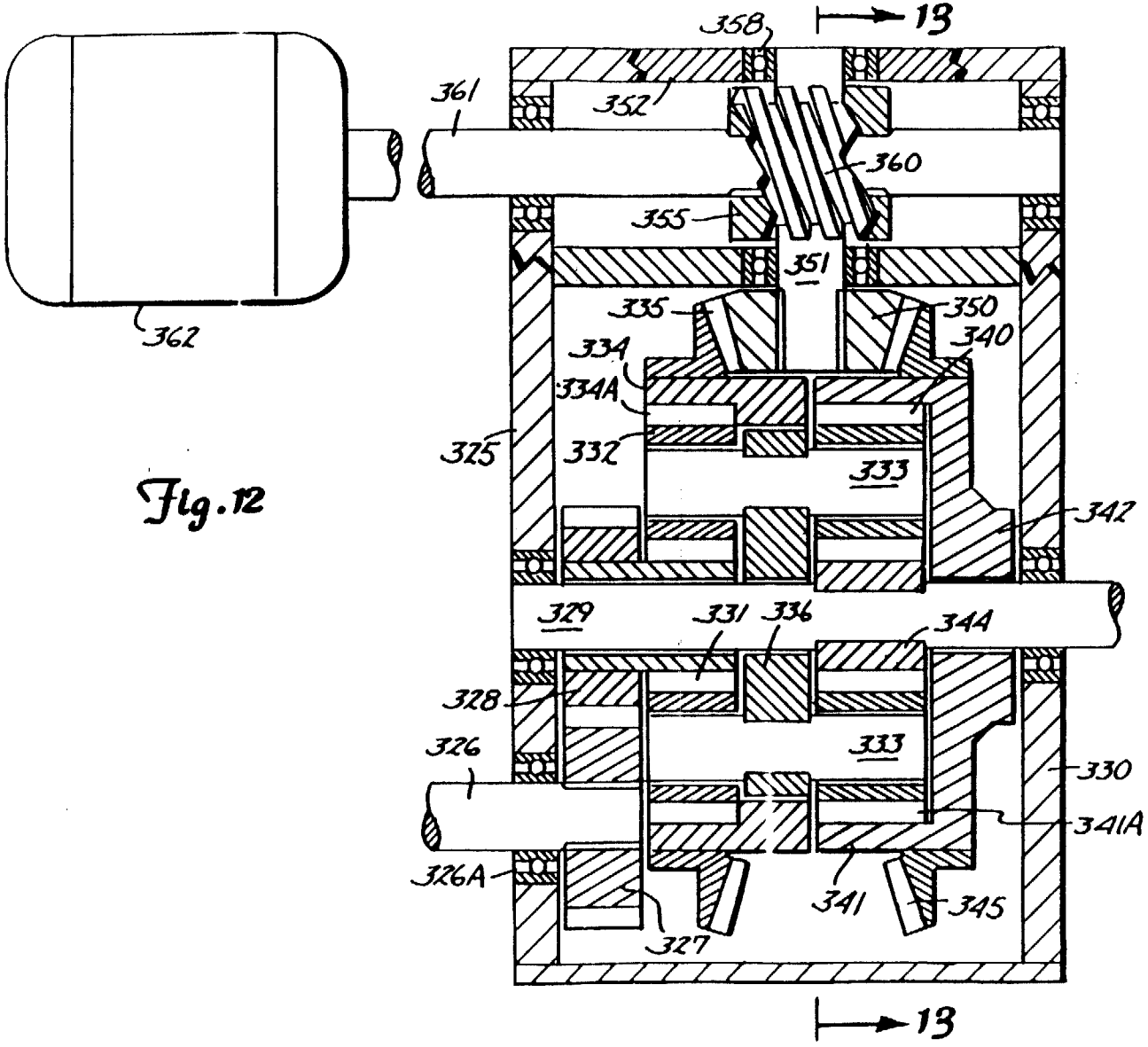
Figure 13:
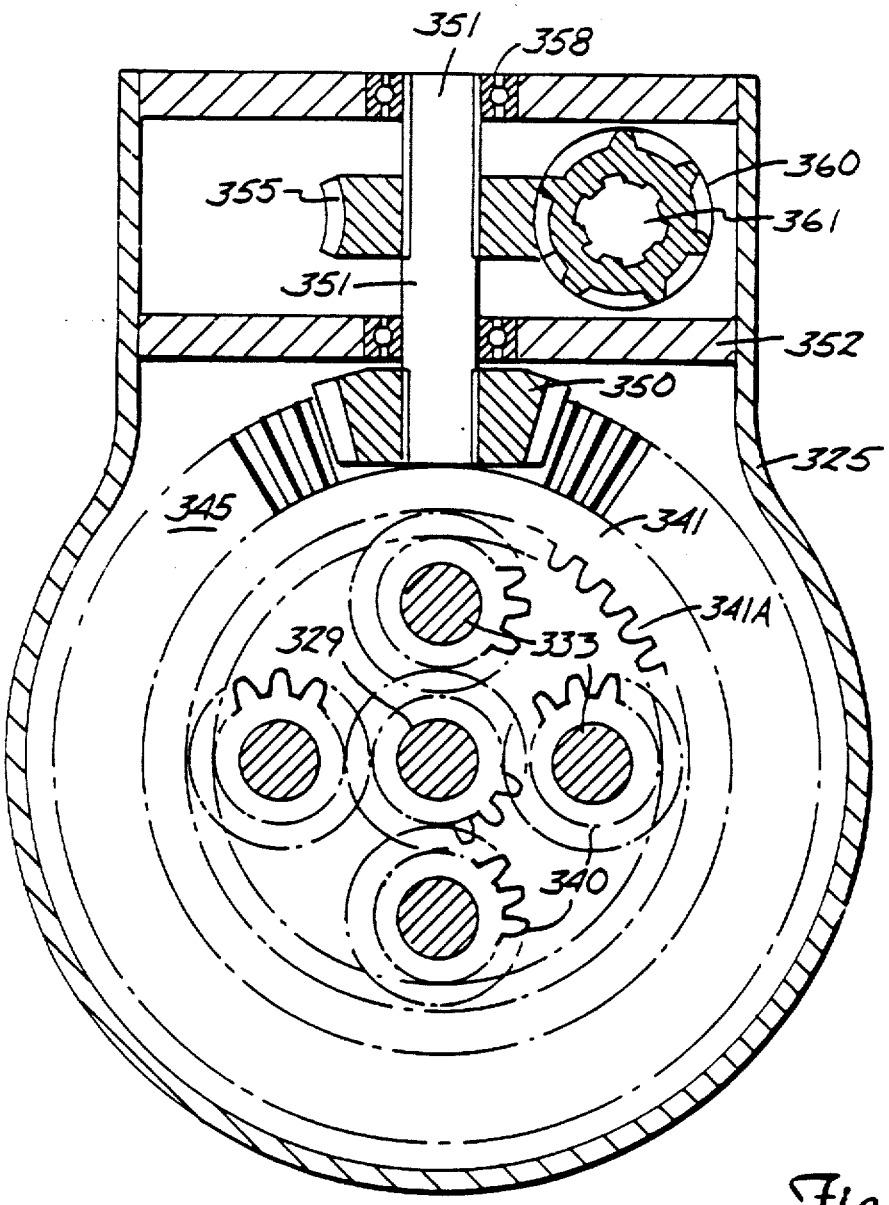
Figure 14:
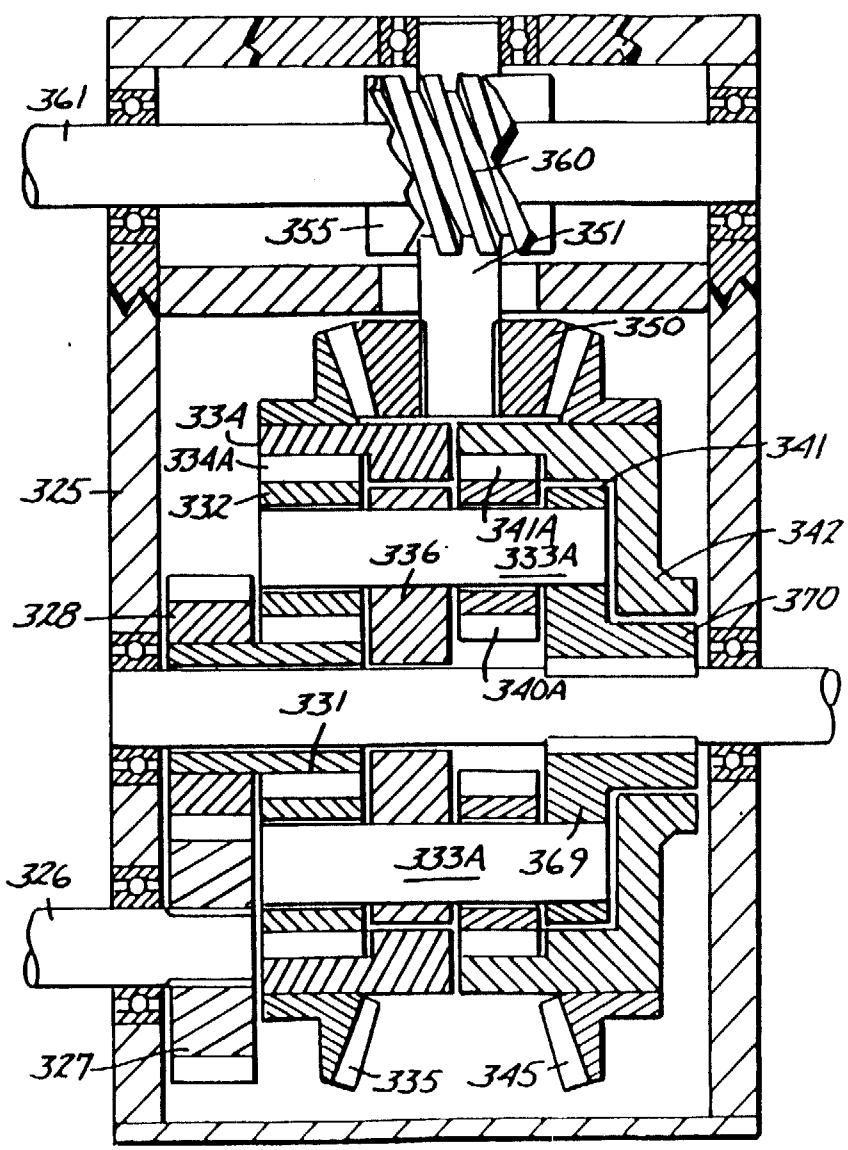
Figure 14:
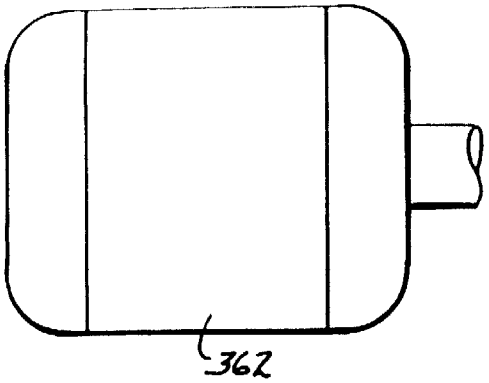
Figure 15:
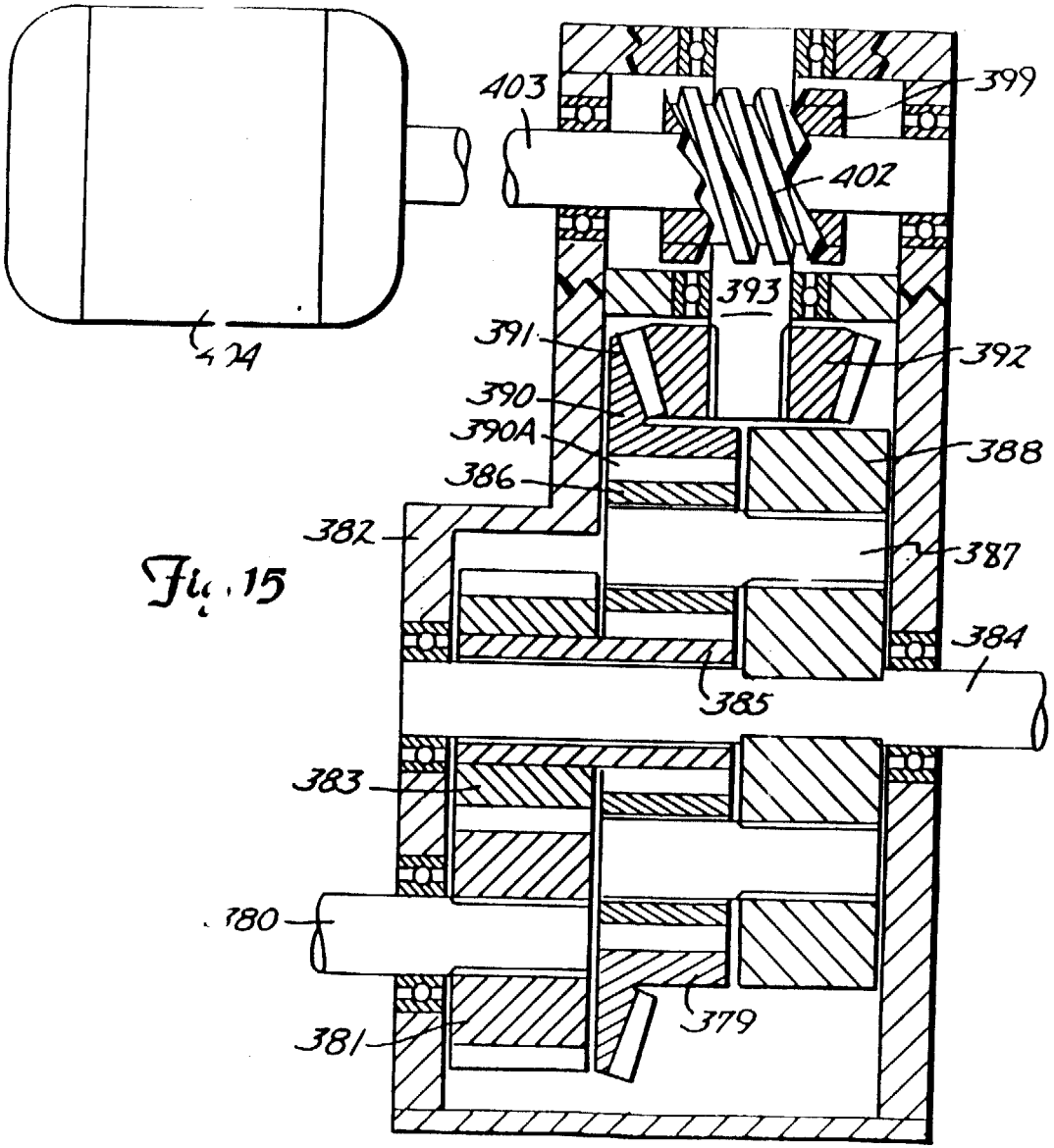

In FIG. 15, a simpler version of a continuously variable ratio transmission made according to the present invention is shown. This device uses the same type of planetary gear arrangement, as shown in FIG. 13, but has an input shaft 380 that drives a spur gear 381 on the interior of a gear case 382. The spur gear 381 drives a second gear 383 that is rotatably mounted on an output shaft 384. Gear 383 has a sun gear 385 drivably associated therewith for rotation with the gear 383, relative to the output shaft 384, and the sun gear 385 in turn drives a plurality of planet gears 386.

The planet gears 386 are rotatably mounted on planet shafts 387 that are fixedly mounted in a planet shaft spider or hub 388 that in turn is drivably mounted on the output shaft 384. The planet gears 386 also drivably engage sun gear 385. The planet gears 386 also drivably engage an internal gear 390A of ratio control gear housing 390 that has an outer bevel gear 391 thereon. Control for continuously varying the output ratio is achieved with a pinion 392 drivably mounted onto a ratio control shaft 393 that is rotatably mounted in suitable bearings on cross members in the case 382. The shaft 393 is arranged as shown in FIG. 13, and has a worm gear 394 drivably mounted on the shaft 393. A worm 402 is drivably mounted onto an output shaft 403 of a control motor 404 that is the same type of motor as previously described.

By varying the speed of the control motor, the rotation of the ratio control gear housing 390 that controls the cluster gears for the planetary action through the ratio control section 379 is all that is necessary for controlling the output ratio between the input and output shafts. This version shown in FIG. 15 is simplified by reducing the number of gears, and provides for a compact continuously variable transmission that would find adaption in small vechicles such as garden tractors, all terrain vehicles, or even motorcycles. In this instance, however, in order to obtain zero output speed of the output shaft 384 when the input shaft 380 was at idling engine speed, the shaft 403 would have to rotate faster than that shown in FIG. 12.

In this form of the invention also, the output ratio is three-to-one if the sun gear to annular gear (390A) ratio is three-to-one. The forms of the invention in FIGS. 14 and 15 are especially useful in motorcycle application and provide infinitly variable ratio transmission as well as a desired final drive ratio in one small package.

All forms of the invention provide an easily controlled continuously variable ratio transmission that can be adapted to a wide range of applications for motorcycles, three-wheeled vehicles and four-wheel drives, and with or without the torque proportioning features.

Although the present invention has been described with reference to preferred embodiments, workers skilled in the art will recognize that changes may be made in form and detail without departing from the spirit and scope of the invention.

While deviation from the wording of descriptions and the presentation and proportions shown in the initial informal drawings will occur as the invention is designed for specific applications, the drawings and descriptions herein are held to encompass the same and to be by way of explanation rather than limitation. Obviously, innumerable departures are possible, such as: dimensions of axles and drive shafts, shaft center distance, diametral pitch and pitch diameter of gears, helix angle of worms and worm gears, design of the outer case and assembly features; spacing, shimming, and friction reducing components; and type and number of bearings, materials, and lubrication mediums and methods. For instance, such specifics as the use of different worm and worm gear helix angles for the differentiated arrangement, with intention of enhancing differentiation under some circumstances while not interfering with retainment of torque, is an engineering design decision encompased in the claimed inventive concepts depicted and described.

What is claimed is:

1. A variable ratio transmission comprising:

first and second gear clusters;

means to rotatably mount the gear clusters about separate, parallel mounting axes for independent rotation relative to each other;

each of said gear clusters comprising a plurality of rotatable gears including an input gear rotatable about an axis coincident with its respective mounting axis, an output shaft, output gear means for driving the output shaft, and control gear means to effect a driving connection between the input gear and the output shaft through the output gear means;

means for simultaneously driving the input gears of both gear clusters; and means for selectively and simultaneously controlling rotation of both of the gear clusters to simultaneously vary the effective ratio of rotation between the input gear and output shafts of both clusters through the output gear means of the clusters.

2. The transmission of claim 1 wherein said means for selectively controlling rotation of the gear clusters comprises variable speed motor means.

3. The transmission of claim 1 wherein the output shaft, the output gear means and the input gears of each cluster are coaxial.

4. The transmission of claim 1 wherein the input gear and output gear means of both clusters comprise bevel gears, said output gear means of both clusters comprising spider gears mounted on radial shafts fixed to the respective output shaft.

5. The transmission of claim 2 wherein said gear clusters both comprise planetary gear clusters, the control gear means carried on the respective clusters comprising gear teeth that engage a further gear to control rotation of the respective gear cluster[s] and vary the ratio between the input gear and the output gear means of that cluster.

6. The apparatus as specified in claim 3 wherein said input gear, said output gear means and said control gear means of both clusters comprises spur gears that are mounted on the same axis as the respective output shaft.

7. The apparatus as specified in claim 1 wherein said means for controlling rotation of the gear clusters comprises gear tooth means on the clusters and a separate control gear engaged with said gear tooth means of both clusters and independently driven by a variable speed motor.

8. A variable ratio transmission having a torque proportioning output comprising a common power input shaft driving a pair of substantially identical variable ratio transmissions and a pair of output shafts, a separate output shaft driven by each of the transmissions, each of said transmissions comprising:

a gear cluster[,] ;

means to rotatably mount the gear cluster about a separate first axis generally parallel to the first axis of the other transmission[,] ;

a plurality of rotatable gears *supported on a gear housing* including an input gear rotatable about an axis coincident with the first axis, output gear means for driving one output shaft, and first control gear means carried on the gear housing to effect a driving connection between the input gear and output shaft through the output gear means[,] ;

means for selectively controlling rotation of the gear housing to vary the effective ratio of rotation between the input gear and output shaft through the output gear means[,] ;

second control gear means mounted for rotation with respect to the output shaft, said second control gear means controlling the final ratio to the output gear means and the output shaft with respect to the speed of the input gear; and means for simultaneously controlling rotation of each of the second control gear means comprising a pair of worms, one driving each of said second control gear means, and a worm gear common to and engaged by both of said worms, whereby each of the worms will rotate only when the other worm rotates in an opposite direction, said worms and worm gear cooperating to permit rotation of one of the second control gear means as a function of the rotation of the other second control gear means to control differential rotation of said output shafts.

9. The variable ratio transmission and torque proportioning drive of claim 8 wherein said worms are each rotatably mounted on one of said output shafts, respectively.

10. The variable ratio transmission of claim 8 wherein said means for selectively controlling rotation of each of said gear [housings] *clusters* comprises a common variable speed motor means.

11. The apparatus as specified in claim 8 wherein said variable ratio transmission comprise spur gear sets arranged as planetary transmissions, said gear housing having gear teeth therein which engage planet gears to control rotation of the planet gears relative to the output shaft.

12. The apparatus as specified in claim 8 wherein said variable ratio transmission comprises bevel gear means, said output gear means comprising spider gears mounted onto a spider fixed to said output shaft, and a gear housing carrying a plurality of second spider gears coupled to said first mentioned spider gears through a common side bevel gear engaging both sets of spider gears, and said second control gear means comprising a further side bevel gear engaging the second set of spider gears.

13. A variable ratio transmission having an output shaft and comprising:

a gear cluster;

means to rotatably mount the gear cluster about a first axis;

a plurality of rotatable gears including a bevel gear comprising an input gear rotatable about an axis coincident with the first axis, output gear means comprising beveled gears arranged as spider gears mounted on radial shafts fixed to the output shaft for driving the output shaft, and control[s] gear means carried on the gear cluster *to* effect a driving connection between the input gear and output shaft through the output gear means;

a second set of bevel gears carried by a gear housing which controls the ratio of drive between the input gear and output gear means, said second set of bevel gears being rotatably mounted on the gear housing on axes radially extending with respect to the output shaft and said gear housing surrounding [the] *a* second set of bevel gears; and means for selectively controlling rotation of the gear housing to vary the effective ratio of rotation between the input gear and output shaft through the output gear means.

* * * * *

UNITED STATES PATENT AND TRADEMARK OFFICE

CERTIFICATE OF CORRECTION

PATENT NO. : Re. 33,278

DATED : July 31, 1990

INVENTOR(S) : Edward W. Johnshoy

It is certified that error appears in the above-identified patent and that said Letters Patent is hereby corrected as shown below:

The title page showing the illustrative figure should be deleted to appear as per attached title page.

The sheets of drawings should be deleted to be replaced with the thirteen (13) sheets of drawings as shown on the attached sheets.

Signed and Sealed this

Twenty-ninth Day of January, 1991

*Attest:*

HARRY F. MANBECK, JR.

*Attesting Officer*

*Commissioner of Patents and Trademarks*

United States Patent [19]

Johnshoy

[11] E Patent Number: Re. 33,278

[45] Reissued Date of Patent: Jul. 31, 1990

[54] CONTINUOUSLY VARIABLE TRANSMISSION AND TORQUE RETAINING DIFFERENTIAL

[76] Inventor: Edward W. Johnshoy, R.R. #1, Box 258A, Mentor, Minn. 56736

[21] Appl. No.: 295,289

[22] Filed: Dec. 30, 1988

Related U.S. Patent Documents

Reissue of:

[64] Patent No.: 4,784,017
Issued: Nov. 15, 1988
Appl. No.: 27,215
Filed: Mar. 17, 1987

U.S. Applications:

[63] Continuation-in-part of Ser. No. 881,827, Jul. 3, 1986.

[51] Int. Cl.[5] ..... F16H 37/06; F16H 1/40

[52] U.S. Cl. ..... 475/6; 74/665 T; 475/5; 475/7; 475/9

[58] Field of Search ..... 74/665 A, 665 B, 665 C, 74/665 T, 715, 710, 713, 674, 675, 793

[56] References Cited

U.S. PATENT DOCUMENTS

| | | | |
|---|---|---|---|
| 633,234 | 9/1899 | Catois | 74/665 T |
| 1,724,714 | 8/1929 | Kersten | 74/675 |
| 2,128,413 | 8/1938 | Hejduk et al. | 74/665 A |
| 2,422,343 | 6/1947 | Duer | 74/675 |
| 2,780,299 | 9/1956 | Egy | 74/675 |
| 2,840,841 | 5/1958 | Matson | 74/713 X |
| 2,847,876 | 8/1958 | Willard | 74/681 X |
| 2,898,779 | 5/1958 | Mickelson | 74/715 |
| 3,013,452 | 12/1961 | Hornbostel | 75/675 |
| 3,220,284 | 11/1965 | Horvath | 74/674 |
| 3,364,789 | 1/1965 | Whitfield | 74/675 |
| 3,477,300 | 11/1969 | Segerstad | 74/675 |
| 3,788,165 | 1/1974 | Klotsvog | 74/665 C X |
| 4,599,916 | 7/1986 | Hirosawa | 74/689 |
| 4,602,525 | 7/1986 | Moroto et al. | 74/689 |
| 4,608,885 | 9/1986 | Koivunen | 74/689 |
| 4,624,153 | 11/1986 | Itoh et al. | 74/689 |
| 4,627,308 | 12/1986 | Moroto et al. | 74/689 |
| 4,628,766 | 12/1986 | de Brie Perry | 74/691 |
| 4,630,504 | 12/1986 | Smirl | 74/689 |
| 4,633,736 | 1/1987 | Sakakibara et al. | 74/689 |
| 4,644,820 | 2/1987 | Macey et al. | 74/689 |
| 4,700,589 | 10/1987 | Coronel | 74/681 X |

FOREIGN PATENT DOCUMENTS

| | | | |
|---|---|---|---|
| 567890 | 10/1957 | Italy | 74/675 |

OTHER PUBLICATIONS

Lamm, Michael; "Get Ready for a New Kind of Automatic Transmission," *Popular Mechanics*, Jun. 1984, pp. 70–71, 105–108.

*Primary Examiner*—Dirk Wright
*Attorney, Agent, or Firm*—Kinney & Lange

[57] ABSTRACT

A fully geared continuously variable transmission controls output ratios of differentiating gear sets by using a control gear set that is controlled as to rotation speed by a variable speed drive. The ratio gear sets can be bevel gear differentiating clusters or planetary gear sets. As disclosed, the transmission may have two sets of ratio control gears driving separate output shafts that are coupled to rotatable worms engaged with a worm gear to control differentiation between the output shafts which are used as drives for two wheel or four wheel drive vehicles at selected engine idle rpm the variable speed drive rotates the control gears at a selected speed and directs rpm, that holds the output shafts at 0 rpm. As engine rpm is increased to selected cruising final drive ratio the variable speed drive rpm is decreased proportionately to zero to change the output drive ratio continuously as a function of a selected parameter.

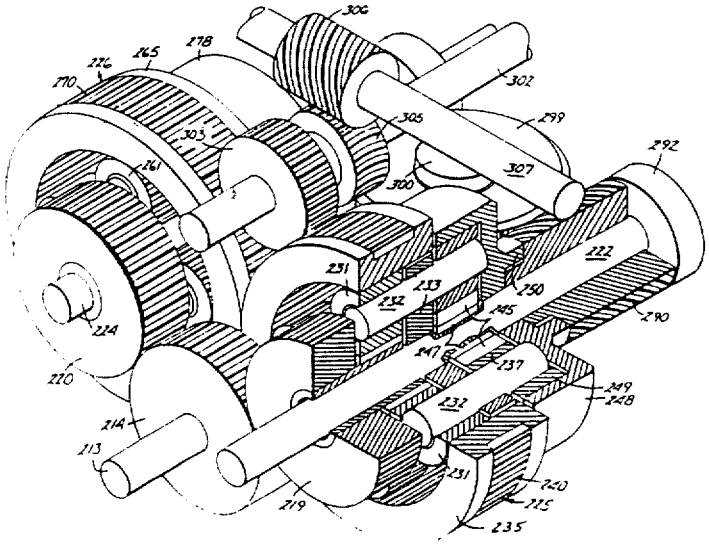

13 Claims, 13 Drawing Sheets